(12) United States Patent
Ohta et al.

(10) Patent No.: US 9,067,185 B2
(45) Date of Patent: Jun. 30, 2015

(54) PROCESS FOR PRODUCING GRAPHITE FILM

(75) Inventors: Yusuke Ohta, Settsu (JP); Takashi Inada, Settsu (JP); Makoto Mishiro, Settsu (JP); Yasushi Nishikawa, Settsu (JP)

(73) Assignee: KANEKA CORPORATION, Osaka-Shi (JP)

( * ) Notice: Subject to any disclaimer, the term of this patent is extended or adjusted under 35 U.S.C. 154(b) by 0 days.

(21) Appl. No.: 14/007,786

(22) PCT Filed: Mar. 26, 2012

(86) PCT No.: PCT/JP2012/057757
§ 371 (c)(1),
(2), (4) Date: Sep. 26, 2013

(87) PCT Pub. No.: WO2012/133311
PCT Pub. Date: Oct. 4, 2012

(65) Prior Publication Data
US 2014/0015153 A1      Jan. 16, 2014

(30) Foreign Application Priority Data
Mar. 28, 2011   (JP) ................. 2011-071010

(51) Int. Cl.
*B01J 6/00* (2006.01)
*C01B 31/04* (2006.01)

(52) U.S. Cl.
CPC ................. *B01J 6/008* (2013.01); *C01B 31/04* (2013.01); *C01P 2006/60* (2013.01)

(58) Field of Classification Search
CPC .......................................... B01J 6/00

USPC ........................................................ 264/29.7
See application file for complete search history.

(56) References Cited

U.S. PATENT DOCUMENTS

| | | | |
|---|---|---|---|
| 4,842,665 A | 6/1989 | Taguchi et al. | |
| 4,915,984 A | 4/1990 | Murakami | |
| 5,064,019 A * | 11/1991 | Murakami et al. | 181/170 |

FOREIGN PATENT DOCUMENTS

| | | |
|---|---|---|
| JP | 61-275116 A | 12/1986 |
| JP | 61-275117 A | 12/1986 |

(Continued)

OTHER PUBLICATIONS

International Search Report, mailed Jun. 5, 2012, issued in PCT/JP2012/057757.

(Continued)

*Primary Examiner* — Larry Thrower
*Assistant Examiner* — Xue Liu
(74) *Attorney, Agent, or Firm* — Birch, Stewart, Kolasch & Birch, LLP

(57) ABSTRACT

The present invention performs special heat treatment on a polymer film in a temperature range from (i) a lower limit to temperature rise being equal to or higher than a starting temperature of thermal decomposition of the polymer film, i.e., which is a temperature observed at an early stage of the thermal decomposition of the polymer film, to (ii) an upper limit to temperature rise being equal to or lower than an intermediate temperature of thermal decomposition of the polymer film. This reduces foaming in the film during graphitization treatment following the special heat treatment. Thus, even with a higher heating rate for graphitization, it is possible to produce a graphite film having good quality.

7 Claims, 5 Drawing Sheets

(56) References Cited

FOREIGN PATENT DOCUMENTS

| JP | 1-105199 A | 4/1989 |
|---|---|---|
| JP | 2000-169125 A | 6/2000 |
| JP | 2000-178016 A | 6/2000 |
| JP | 2003-165715 A | 6/2003 |
| JP | 2004-299937 A | 10/2004 |
| JP | 2008-24571 A | 2/2008 |
| JP | 2009-203153 A | 9/2009 |

OTHER PUBLICATIONS

Written Opinion of the International Searching Authority, mailed Jun. 5, 2012, issued in PCT/JP2012/057757.
International Preliminary Report on Patentability and English translation of the Written Opinion of the International Searching Authority dated Oct. 10, 2013 for Application No. PCT/JP2012/057757.

* cited by examiner

PROCESS FOR PRODUCING GRAPHITE FILM

TECHNICAL FIELD

The present invention relates to a process (method) for producing a graphite film.

BACKGROUND ART

Polymer-baking types of graphite films have excellent heat-dissipating properties, and as such, are used as heat dissipation components for dissipating heat from components that generate heat, e.g., for semiconductor elements that are mounted in various electronic or electric apparatuses such as computers. A conventional method for producing a graphite film has included a carbonization step for pre-baking a polymer film at temperatures up to approximately 1000° C. and a graphitization step for heat-treating, at temperatures up to approximately 2700° C., the carbonized film given by the carbonization step. For example, Patent Literature 1 discloses a method for producing a thick graphite film by using a 125-μm polyimide film as a raw material. Patent Literature 1 discloses that a graphite film having an even, flat surface is produced by performing carbonization at temperatures up to 1000° C. at a heating rate of 5° C./min and performing graphitization at temperatures up to 2800° C. at a heating rate of 1° C./min.

Incidentally, Patent Literature 2 discloses a method for producing a graphite film by using a 75-μm polyimide film as a raw material. Patent Literature 2 discloses that a graphite film is produced by performing carbonization at temperatures up to 1600° C. at a heating rate of 1° C./min, 5° C./min, or 20° C./min and performing graphitization at temperatures up to 2700° C. at a heating rate of 3° C./min.

CITATION LIST

Patent Literatures

Patent Literature 1
Japanese Patent Application Publication, Tokukai, No. 2008-024571 A (Publication Date: Feb. 7, 2008)
Patent Literature 2
Japanese Patent Application Publication, Tokukai, No. 2000-178016 A (Publication Date: Jun. 27, 2000)

SUMMARY OF INVENTION

Technical Problem

However, according to the methods of Patent Literatures 1 and 2, it is difficult to reduce peeling or wrinkling on a surface of the graphite film. The present invention has an object to produce a graphite film having less peeling or wrinkling on its surface.

Solution to Problem

That is, the method of the present invention for producing a graphite film relates to a method for producing a graphite film by heat-treating a polymer film, including: a film modification step for heat-treating a polymer film at a heating rate of 5° C./min or more in a temperature range from (i) a lower limit to temperature rise being equal to or higher than a starting temperature of thermal decomposition of the polymer film to (ii) an upper limit to temperature rise being equal to or lower than an intermediate temperature of thermal decomposition of the polymer film; and thereafter heat-treating the polymer film at a temperature of 2000° C. or higher.

Advantageous Effects of Invention

According to the method of the present invention for producing a graphite film, it is possible to reduce peeling and wrinkling on a surface of the graphite film.

DESCRIPTION OF EMBODIMENTS

Figure 1:
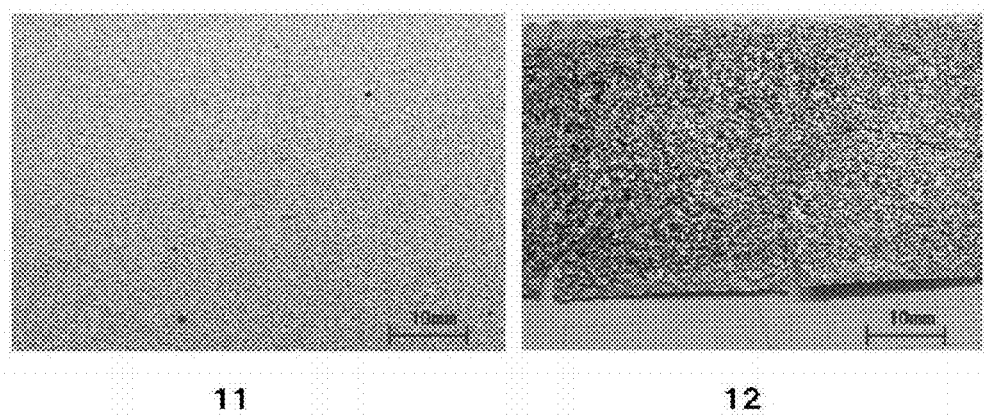
FIG. 1 shows photographs showing a bump and peeling from a surface, respectively, each of which was caused by excessive foaming.

The present invention relates to a method for producing a graphite film, including: a film modification step for performing heat treatment at a heating rate of 5° C./min or more in a temperature range from (i) a lower limit to temperature rise being equal to or higher than a starting temperature of thermal decomposition of the polymer film to (ii) an upper limit to temperature rise being equal to or lower than an intermediate temperature of thermal decomposition of the polymer film; and thereafter performing heat treatment at a temperature of 2000° C. or higher.

The above method means a method for producing a graphite film by heat-treating a polymer film, including: a film modification step for performing heat treatment at a heating rate of 5° C./min or more in a temperature range from (i) a lower limit to temperature rise being equal to or higher than a starting temperature of thermal decomposition of the polymer film to (ii) an upper limit to temperature rise being equal to or lower than an intermediate temperature of thermal decomposition of the polymer film; and thereafter performing heat treatment at a temperature of 2000° C. or higher.

Conventionally, in order to produce a graphite film having an even surface and good quality, a heating rate during graphitization must be decreased. This, however, results in quite poor productivity.

In a case where a particularly thick polymer film is used as a raw material, a resulting graphite film has defects such as peeling and/or a bump on its surface. According to the present invention, special heat treatment (herein, also referred to as "film modification step") is additionally performed within a particular temperature range at an early stage of decomposition of a polymer film. This makes it possible to reduce foaming occurred in a carbonized film during a graphitization process, which follows the above-described special heat treatment. As a result, even with a higher heating rate during graphitization, it is possible to produce a graphite film having good duality.

A mechanism how the film modification step brings about its effects is as follows. In the film modification step, a heat history of a thermal change(s) is rapidly given to a polymer film at an early stage of decomposition of the polymer film, thereby making it possible to disorder orientation of a molecular chain of the polymer. In the polymer film whose molecular chain orientation has been thus disordered, a graphite layer is difficult to develop to a high temperature range during graphitization, and thereby internal gas which is generated during the graphitization can be discharged smoothly. This reduces foaming in a carbonized film, with the result that a graphite film having an even surface can be easily produced. Namely, a target object to be heat-treated in the film modification step is a polymer film or a carbonized film (in the film modification step, a polymer film or a carbonized film is heat-treated). Note that the term "carbonized film" of the present invention encompasses a polymer film whose weight has started to decrease (or whose weight has decreased) due to heating.

Further, the present invention can include, following the film modification step, performing cooling at a cooling rate of 10° C./min or more in a temperature range from (i) the upper limit to temperature rise to (ii) a temperature being equal to or lower than the starting temperature of thermal decomposition of the polymer film. In such the case, the polymer film is cooled with the orientation of the molecular chain of the polymer disordered, with the result that foaming is further reduced therein. This makes it easier to produce a film having an even surface. That is, according to the present invention, the film modification step is performed at an early stage of a decomposition reaction of a polymer film, thereby modifying the polymer film into a raw material which is easy to be transformed into a graphite film having good quality.

<Temperature at which Film Modification Step is Performed>

The film modification step of the present invention is performed in a temperature range from (i) a lower limit to temperature rise being equal to or higher than a starting temperature of thermal decomposition of a polymer film to (ii) an upper limit to temperature rise being equal to or lower than an intermediate temperature of thermal decomposition of the polymer film.

Heat-treating the polymer film at a temperature higher than the starting temperature of thermal decomposition of the polymer film makes it possible to disorder the orientation of the molecular chain. Further, heat-treating the polymer film at a temperature lower than the intermediate temperature of the thermal decomposition does not disorder the molecular chain too much, so as not to hinder progress of graphitization. The starting temperature of thermal decomposition of the polymer film, the intermediate temperature of the thermal decomposition, the lower limit to temperature rise, and the upper limit to temperature rise are actual temperatures of the polymer film itself being heat-treated. The actual temperature of the polymer film itself can be measured by using a 0.5 mm diameter sheathed K thermocouple brought into contact with the polymer film.

Note that the heat-treating is not particularly limited as to heat treatment conditions regarding a temperature below the starting temperature of thermal decomposition of the polymer film, and regarding a temperature below the lower limit to temperature rise. Also, if once the film modification step is performed, the heat-treating is not particularly limited as to heat treatment conditions regarding a temperature higher than the upper limit to temperature rise, and regarding a temperature higher than the intermediate temperature of the thermal decomposition. The term "starting temperature of thermal decomposition of a polymer film" here is defined as a temperature at which the polymer film loses 1.0% of its initial weight as a result of heat treatment performed at a heating rate of 10° C./min.

Specifically, the term "starting temperature of thermal decomposition of a polymer film" is defined as a temperature at which a 10 mg sample of the polymer film loses 1.0% of its weight as a result of heat treatment performed at a heating rate of 10° C./min from a room temperature (23° C.) to 1000° C. in a flowing nitrogen atmosphere (200 ml/min) by using a thermal analysis system EXSTAR6000 and a thermogravimetric apparatus TG/DTA 220U (both manufactured by SII Nanotechnology Inc.).

In a case of polyimide films (APICAL AH, available from Kaneka Corporation in a thickness of 75 μm; APICAL NPI, available from Kaneka Corporation in thicknesses of 75 μm and 125 μm), which were used in Examples of the present invention, the starting temperature of thermal decomposition of the polymer film is 500° C. This starting temperature of thermal decomposition of the polymer film was measured as defined above. The term "intermediate temperature of thermal decomposition of a polymer film" is an upper limit to a temperature allowing the film modification step. If the film modification step is performed at a temperature above the intermediate temperature of the thermal decomposition, the molecular chain is disordered too much, which hinders progress of graphitization.

As an example, in a case of a polymer film having a birefringence of less than 0.13, the intermediate temperature of thermal decomposition thereof is defined as a temperature at which the polymer film loses 400% of its initial weight as a result of heat treatment performed at a heating rate of 10° C./min.

Specifically, the intermediate temperature of thermal decomposition of such the polymer film is a temperature at which a 10 mg sample of the polymer film loses 40.0% of its weight as a result of heat treatment performed at a heating rate of 10° C./min from a room temperature (23° C.) to 1000° C. in a flowing nitrogen atmosphere (200 ml/min) by using a thermal analysis system EXSTAR6000 and a thermogravimetric apparatus TG/DTA 220U (both manufactured by SII Nanotechnology Inc.). In Examples of the present invention, used as such the polymer film was Kaneka's polyimide film APICAL AH having a thickness of 75 μm and a birefringence of 0.12.

In a case of a polymer film having a birefringence of 0.13 or more, the intermediate temperature of thermal decomposition is defined as a temperature at which the polymer film loses 44.0% of its initial weight as a result of heat treatment performed at a heating rate of 10° C./min. Specific measurement conditions are the same as those of the polymer film having a birefringence of less than 0.13. In Examples of the present invention, used as such the polymer film was Kaneka's polyimide film APICAL NPI having a thickness of 75 μm and a birefringence of 0.14 or Kaneka's polyimide film APICAL NPI having a thickness of 125 μm and a birefringence of 0.14.

The intermediate temperature of thermal decomposition of the present invention is preferably 900° C. or lower, more preferably 800° C. or lower, further more preferably 700° C. or lower, still more preferably 650° C. or lower, particularly preferably 600° C. or lower. In the case where the intermediate temperature of thermal decomposition is 900° C. or lower, the polymer film is not completely carbonized, and therefore still maintains the nature of the polymer and is difficult to crack. Further, in such the case, an amount that the polymer film shrinks is small, with the result that the polymer film is difficult to get wrinkles.

In the case of Kaneka's polyimide film APICAL AH having a birefringence of 0.12 and a thickness of 75 µm, which was used in Examples of the present invention, the intermediate temperature of thermal decomposition is 750° C. This intermediate temperature of thermal decomposition was measured as defined above. In the case of Kaneka's polyimide film APICAL NPI having a birefringence of 0.14 and a thickness of 75 µm or 125 µm, which was used in Examples of the present invention, the intermediate temperature of thermal decomposition is 800° C. This intermediate temperature of thermal decomposition was measured as defined above.

<Heating Rate and Cooling Rate During Film Modification Step>

According to the present invention, it is necessary to control, during the film modification step, the heating rate so that it follows a particular condition. During the film modification step of the present invention, the heating rate from the lower limit to temperature rise to the upper limit to temperature rise is preferably 5° C./min or more, more preferably 10° C./min or more, further more preferably 50° C./min or more, particularly preferably 100° C./min. Giving a heat history of a thermal change(s) rapidly to a polymer film at a rate of 5° C./min or more disorders its molecular chain, thereby making it possible to modify the polymer film into a raw material which is difficult to be foamed.

Further, according to the present invention, cooling can be performed in the film modification step at a cooling rate which follows a particular condition. During the film modification step of the present invention, the cooling rate from the upper limit to temperature rise to the lower limit to temperature rise is preferably 10° C./min or more, more preferably 50° C./min or more, further more preferably 100° C./min or more, particularly preferably 300° C./min. Cooling the polymer film at a rate of 10° C./min or more quenches the molecular chain as disordered, so that the disordered state is maintained. This makes it possible to modify the polymer film into a raw material which is more difficult to be foamed.

In the film modification step, if once the temperature reaches the upper limit to temperature rise, cooling may be started immediately after that or after the temperature is maintained at the upper limit to temperature rise for a predetermined period of time.

In the present invention, heat treatment performed after once the film modification step has been performed is not particularly limited in terms of the heating rate and the cooling rate.

Note that the present invention does not inhibit performing again temperature rise and/or cooling according to the conditions for the film modification step, after once the film modification step is performed.

<Weight Loss Rate and Decomposition Reaction of Polymer Film During Film Modification Step>

As a result of heat-treating a polymer film, substances not involving formation of a graphite skeleton, e.g., carbon, oxygen, hydrogen, and/or nitrogen are sequentially discharged as components of carbon dioxide gas, water, hydrogen gas, nitrogen gas, and/or tar, as the temperature of the heat treatment increases.

As the decomposition of the polymer film progresses, the polymer film becomes blackened and vitrified. The term "weight loss rate of a polymer film during the film modification step" refers to the percentage of decrease in weight of the film after the film modification step with respect to the initial weight of the polymer film, which serves as the starting material. The weight loss rate of the polymer film can be calculated according to the formula shown below. The term "weight loss rate of a polymer film during the film modification step" means the percentage of decrease in weight of the polymer film after the film modification step.

Weight loss rate (%)=[(Initial weight of polymer film−Weight of polymer film immediately after film modification step)/Initial weight of polymer film]×100

The initial weight of the polymer film is the weight of the polymer film as measured at 23° C. after the polymer film has been allowed to stand in an atmosphere of constant 23° C. for 24 hours prior to heat treatment. The weight of the polymer film immediately after the film modification step is the weight as measured at 23° C. after the polymer film has been allowed to stand in an atmosphere of constant 23° C. for 24 hours, immediately after the film modification step.

<Birefringence>

The term "birefringence" means a difference between (i) a refractive index of the film in any direction in a plane of the film and (ii) a refractive index of the film in its thickness direction, and can be rephrased as "double refractive index". In the present invention, there is no particular limitation on the birefringence of the polymer film. Preferably used is a polymer film having a birefringence of 0.08 or more. Carbonization and graphitization of the polymer film having a birefringence of 0.08 or more progress more easily, with the result that a graphite film having a graphite layer developed is more likely to be produced.

Depending on the birefringence, how easily foaming occurs in the film after the graphitization changes. The larger the birefringence becomes, more easily foaming occurs in the film. In order to bring about the effects of the film modification step of the present invention, the upper limit to temperature rise should be set higher so as to allow decomposition of the polymer film to progress. Note that there is no particular limitation on an upper limit to the birefringence. For example, the upper limit to the birefringence may be 0.20 or less, or 0.18 or less.

In the case of the polymer film having a birefringence of less than 0.13, e.g., Kaneka's polyimide film APICAL AH having a birefringence of 0.12 and a thickness of 75 µm, which was used in Examples, the heat treatment during the film modification step is as follows. An upper limit to temperature rise within a temperature range which is suitable to heat-treat such the polymer film at a heating rate of 5° C./min or more during the film modification step is 520° C. or higher but 700° C. or lower, preferably 555° C. or higher but 655° C. or lower, further more preferably 580° C. or higher but 605° C. or lower. If the polymer film is heat-treated with the upper limit to temperature rise set at 520° C. or higher, the effects of the film modification step can be achieved. If the polymer film is heat-treated with the upper limit to temperature rise set at 700° C. or lower, orientation of molecules of the polymer film is not disordered too much during the film modification step, with the result that the film achieves flexibility and improved thermal diffusivity after graphitization. Further, in such the case, the heat-treating the polymer film ends before the decomposition reaction of the polymer film completes. As a result, an amount that the film shrinks is small and therefore the film is difficult to get wrinkles. Furthermore, the film still maintains the nature of the polymer and has not been hardened, and therefore the polymer film hardly cracks.

The lower limit to temperature rise for the film modification step is lower than the upper limit to temperature rise, and is preferably 550° C. or lower, more preferably 525° C. or lower, particularly preferably 500° C. or lower. Heat-treating the polymer film from the lower limit to temperature rise which is set to be lower than the upper limit to temperature rise and to be 550° C. or lower brings about the effects of the film modification step.

Incidentally, a suitable temperature range within which the polymer film is cooled at a cooling rate of 10° C./min or more during the film modification step is from the upper limit to temperature rise for the film modification step to a temperature which is lower than the upper limit to temperature rise, preferably to 550° C. or lower, more preferably to 525° C. or lower, further more preferably to 500° C. or lower. Cooling the polymer film to 550° C. or lower brings about the effects of the film modification step more strongly. Specifically, by cooling the polymer film, the polymer is cooled with the orientation of its molecular chain disordered. Thus, in a case where the polymer film is cooled after the film modification step, it is possible to produce a graphite film having reduced foaming and an even surface more easily than in a case where the polymer film is not cooled after the film modification step which is performed under the same condition.

In the case of the polymer film having a birefringence of less than 0.13, e.g., Kaneka's polyimide film APICAL AH having a birefringence of 0.12 and a thickness of 75 μm, which was used in Examples, the heat treatment is performed so that its weight loss rate during the film modification step is preferably 1.1% or more but 38.0% or less, more preferably 1.2% or more but 30.0% or less, further more preferably 2.8% or more but 15.0% or less. Performing the heat treatment of the polymer film so that its weight loss rate during the film modification step is 1.1% or more suitably brings about the effects of the film modification step. Performing the heat treatment of the polymer film so that its weight loss rate during the film modification step is 38.0% or less allows the film after graphitization to achieve flexibility and improved thermal diffusivity. Further, in such the case, the heat treatment of the polymer film ends before the decomposition reaction of the polymer film completes. As a result, an amount that the film shrinks is small and therefore the film is difficult to get wrinkles. Furthermore, the film still maintains the nature of the polymer and has not been hardened, and therefore the polymer film hardly cracks. The above-described "weight loss rate during the film modification step" means a weight loss rate after the film modification step.

In the case of the polymer film having a birefringence of 0.13 or more, e.g., Kaneka's polyimide film APICAL NPI having a birefringence of 0.14 and a thickness of 75 μm or 125 μm, which was used in Examples, the heat treatment during the film modification step is as follows. An upper limit to temperature rise within a temperature range which is suitable to heat-treat such the polymer film at a heating rate of 5° C./min or more in the film modification step is 580° C. or higher but 750° C. or lower, preferably 605° C. or higher but 730° C. or lower, further more preferably 630° C. or higher but 700° C. or lower. If the polymer film is heat-treated with the upper limit to temperature rise set at 580° C. or higher, the effects of the film modification step can be achieved. If the polymer film is heat-treated with the upper limit to temperature rise set at 750° C. or lower, the film still maintains the nature of the polymer and has not been hardened, and therefore the polymer film hardly cracks. The lower limit to temperature rise for the film modification step is preferably 550° C. or lower, more preferably 525° C. or lower, further more preferably 500° C. or lower. Starting the heat treatment of the polymer film from a temperature of 550° C. or lower favorably brings about the effects of the film modification step.

Incidentally, a suitable temperature range within which the polymer film is cooled at a cooling rate of 10° C./min or more during the film modification step is from the upper limit to temperature rise for the film modification step to preferably 550° C. or lower, more preferably 525° C. or lower, further more preferably 500° C. or lower. Cooling the polymer film to 550° C. or lower favorably brings about the effects of the film modification step. The effects achieved by cooling the polymer film are as described above.

In the case of the polymer film having a birefringence of 0.13 or more, e.g., Kaneka's polyimide film APICAL NPI having a birefringence of 0.14 and a thickness of 75 μm or 125 μm, which was used in Examples, heat treatment of such the polymer film is performed so that its weight loss rate during the film modification step is preferably 4.0% or more but 42.5% or less, more preferably 20.0% or more but 40.0% or less, further more preferably 30.0% or more but 37.5% or less. Performing the heat treatment of the polyimide film so that its weight loss rate during the film modification step is 4.0% or more favorably brings about the effects of the film modification step. Further, in the case where the heat treatment of the polyimide film is performed so that its weight loss rate during the film modification step is 42.5% or less, the heat treatment ends before the decomposition reaction of the polymer film completes. As a result, an amount that the film shrinks is small and therefore the film is difficult to get wrinkles. Furthermore, in such the case, the film still maintains the nature of the polymer and has not been hardened, and therefore the polymer film hardly cracks. The above-described "weight loss rate during the film modification step" means a weight loss rate after the film modification step.

<Graphite Film>

A graphite film can be produced by heat-treating a polymer film serving as a raw material film. A possible example of a polymer film suitable for production of a graphite film is at least one type of polymer film selected from the group consisting of a polyimide film, a polyamide film, a polyoxadiazole film, a polybenzothiazole film, a polybenzobisazole film, a polybenzooxazole film, a polybenzobisoxazole film, a poly(paraphenylene vinylene) film, a polybenzoimidazole film, a polybenzobisimidazole film, and a polythiazole film.

Among those named above, the polyimide film is an especially favorable polymer film, because the polyimide film is more likely to develop a layer structure of graphite through carbonization and graphitization than any other polymer film that is made from an organic material.

<Method for Producing Graphite Film Through Batch-Wise Process>

Examples of a method for producing a graphite film from a polymer film encompass a method including a carbonization step, a graphitization step, and a pressurizing step, which are performed after the film modification step. In the carbonization step, a polymer film serving as a starting material is carbonized by heat-treating the film either under reduced pressure or in an inert gas. In the carbonization step, heat treatment through a batch-wise process is performed usually at a temperature of approximately 1000° C. That is, in the carbonization step, a target object to be heat-treated is a polymer film or a carbonized film (i.e., in the carbonization step, a polymer film or a carbonized film is heat-treated). For example, in the case of preliminary heat treatment performed at a heating rate of 10° C./min from room temperature, it is desirable that heat treatment be performed with the temperature kept in a temperature range of 1000° C. for approximately 30 minutes. At the stage of the preliminary heat treatment, pressure may be applied to the polymer film in a direction parallel to a surface of the film so that the film does not lose its orientation. Note that the term "carbonized film" in the present invention encompasses a film after the film modification step.

The graphitization step, which follows the carbonization step, is performed with the carbonized film set in an ultrahigh-temperature furnace. That is, in the graphitization step, the carbonized film serves as a target object to be heat-treated (i.e., in the graphitization step, the carbonized film is heat-treated).

The graphitization step is performed either under a reduced pressure or in an inert gas. It is most appropriate to use argon as the inert gas, and it is more preferable that a small amount of helium be added to argon. In the graphitization step, heat treatment is performed preferably at a temperature of 2400° C. or higher, more preferably at a temperature of 2600° C. or higher, further more preferably at a temperature of 2800° C. or higher, particularly preferably at a temperature of 2900° C. or higher. Note that the graphitization step may be performed in succession following the carbonization step, or may alternatively be performed after cooling after the carbonization step.

A graphite film obtained through the carbonization step and the graphitization step is in a foamed state in which the graphite layer has been uplifted by the generation of internal gases such as $N_2$ and/or a filler (phosphoric acid filler), which does not involve formation of a graphite skeleton. In the case of a graphite film that is in a foamed state after the graphitization step, the flex resistance can be improved by performing the pressurizing step, such as compression treatment or rolling treatment.

<Bump and Peeling from Surface Caused by Excessive Foaming>

If excessive foaming is caused in the graphite film during the process of the graphitization, the film after the graphitization has an uneven surface. The excessive foaming may cause a bump as shown by the reference sign 11 of FIG. 1, and/or graphite flakes peeled off from the surface (hereinafter, also referred to as peeling from the surface) as shown by the reference sign 12 of FIG. 1. Those are likely to occur particularly in a case where a thick raw material or a raw material having a high birefringence is used. The bump and the peeling from the surface occur in the following mechanism: An inert gas is suddenly generated during the graphitization step, so that a graphite shell layer is expanded to be destroyed.

<Atmosphere for Film Modification Step>

The film modification step of the present invention may be performed in an inert gas (such as nitrogen or argon), an oxygen atmosphere, vacuum, or an atmosphere under a reduced pressure.

<Method of Performing Film Modification Step>

A method of heat-treating the polymer film in the film modification step is not particularly limited, and may be performed in any way. Examples of this method encompass (i) a method of heat-treating, through a batch-wise process, a polymer film which is held in a heat treatment apparatus and (ii) a continuous process of continuously feeding a polymer film into a heat treatment apparatus and taking out the polymer film therefrom.

In terms of productivity, the film modification step of the present invention is preferably performed by the continuous process. The continuous process is preferable also because it is easy to control a heat history of a thermal change(s) given to the polymer film. For example, according to the continuous process, a polymer film is caused to pass through the heat treatment apparatus which is controlled to have a constant temperature. This makes it possible to give to the polymer film an instantaneous heat history of a thermal change(s) such as a rapid temperature rise or rapid cooling, which is difficult to be given by the batch-wise process.

Figure 2:
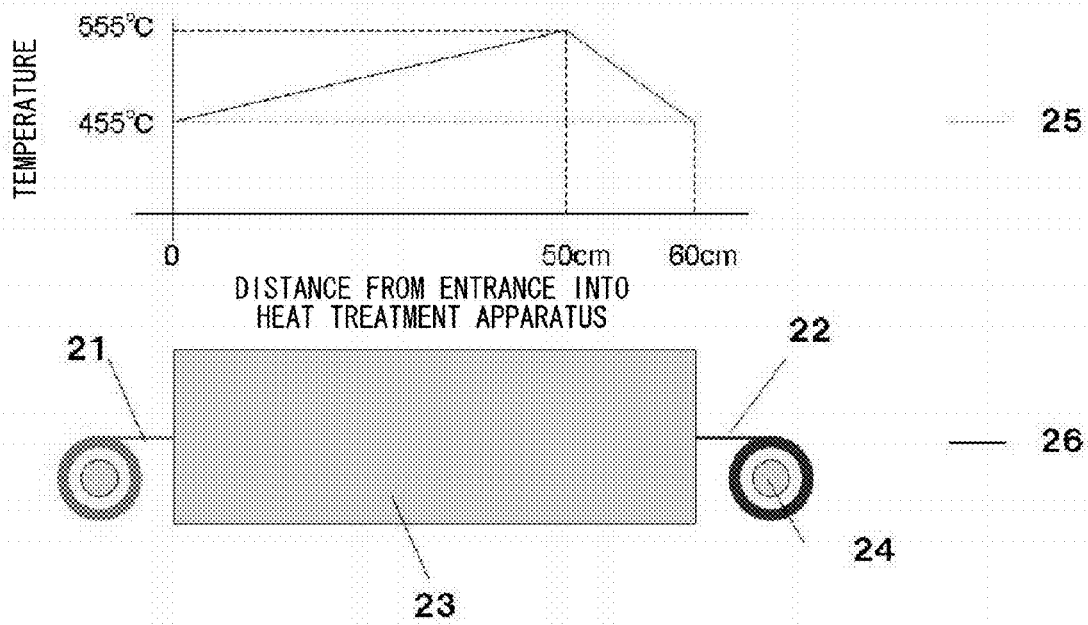
FIG. 2 is a schematic view showing a graph of a temperature gradient and a heat treatment apparatus, etc. for controlling a heating rate and a cooling rate during a film modification step performed in a continuous process.

It is possible to control the heating rate and the cooling rate in the continuous process by causing a film to pass through, at a predetermined line speed, the heat treatment apparatus which is spatially given a temperature gradient. For example, the reference sign 25 of FIG. 2 shows a heat treatment apparatus adjusted so that an entrance into the heat treatment apparatus has a temperature of 455° C., a part of the heat treatment apparatus which is away from the entrance by 50 cm has a maximum temperature of 555° C., and an exit from the heat treatment apparatus which is away from the maximum temperature part by 10 cm has a temperature of 455° C. As shown by the reference sign 25 of FIG. 2, a linear temperature gradient is given to the inside of the heat treatment apparatus. By setting the line speed at 50 cm/min, it is possible to adjust the heat treatment apparatus so that the heating rate is 100° C./min and the cooling rate is 500° C./min, while an actual temperature of the film is within a temperature range from 455° C. to 555° C.

Figure 3:
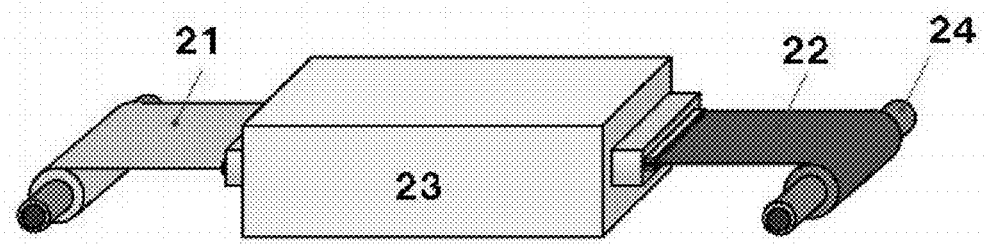
FIG. 3 is a perspective view of a heat treatment apparatus, etc. used for a film modification step performed in a continuous long film producing process.

Examples of the method of performing the film modification step though the continuous process encompass (i) a method of causing a polymer film which is held in a container to pass through the heating device (hereinafter, referred to as "continuous process with a container") and (ii) a method, as shown in FIG. 3, of continuously feeding a long polymer film into the heat treatment apparatus for continuous baking (hereinafter, also referred to as "continuous long film producing process"). The continuous long film producing process is particularly preferable because, with this process, it is easy to control a heat history of a thermal change(s) given to the film.

<Device for Controlling Tension>

In the film modification step, the above-described heat treatment may be performed with a tension applied to the polymer film in a MD direction (machine direction). In the case where the film modification step is performed through the continuous long film producing process of the present invention, the polymer film may be heat-treated with a tension applied to the polymer film by using tension adjustment devices so mounted, for example, upstream and downstream of the heat treatment apparatus as to adjust the tension of the polymer film. Each of the tension adjustment devices is a device for applying a tension to the polymer film, and can give a tension to the polymer film so as to control the tension of the polymer film. Such an adjustment device for controlling tension is achieved, for example, through a method of applying torque to a rotating shaft of such a winding machine as those shown in FIG. 2.

In the film modification step through the continuous long film producing process of the present invention, a pulling strength (tension) applied to the polymer film is 5 kgf/cm$^2$ or more but 500 kgf/cm$^2$ or less, preferably 10 kgf/cm$^2$ or more but 300 kgf/cm$^2$ or less, more preferably 20 kgf/cm$^2$ or more but 100 kgf/cm$^2$ or less. By performing the film modification step with a pulling strength of 5 kgf/cm$^2$ or more, it is possible to reduce the wrinkling of the film which is caused by shrinkage of the film through thermal composition. Further, by performing the film modification step with a pulling strength of 500 kgf/cm$^2$ or less, it is possible to prevent breakage of the film which may occur due to an excess stress to the film.

Note that, even with a tension within the above preferable range, changing the tension can cause the wrinkling of the polymer film. In order to avoid this, it is desirable that, after the tension is set at a desired value, the tension be maintained at the value.

<Total Transmittance of Polymer Film after Film Modification Step>

It is preferable that a total transmittance of the polymer film after the film modification step is reduced as compared with a total transmittance of the polymer film before the film modification step. A method of measuring the total transmittance of the polymer film after the film modification step will be explained in the descriptions of Examples.

<Load Applied to Film in its Thickness Direction>

Figure 4:
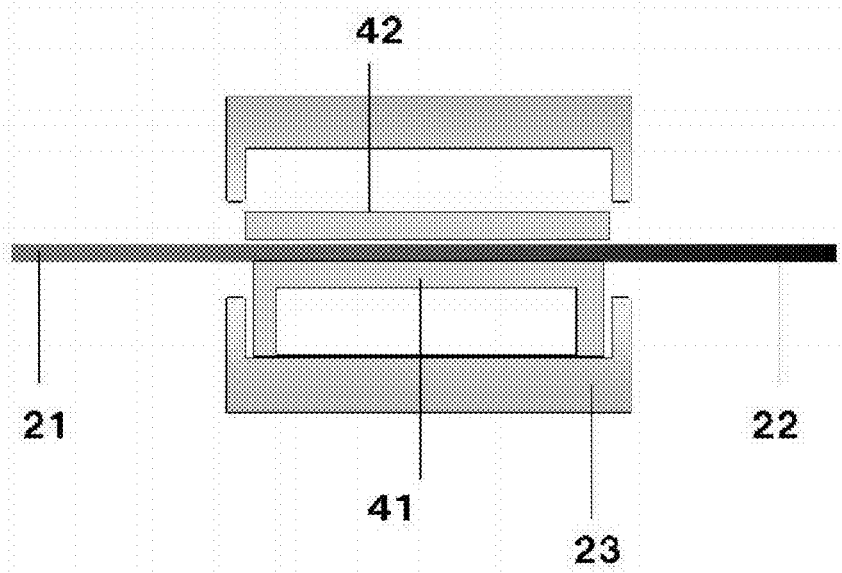
FIG. 4 is a cross-sectional view showing an example of a heat treatment apparatus, etc. used for a method of applying a load to a film in its thickness direction during a film modification step.

It is preferable that in the film modification step of the present invention, a load be applied to the film in its thickness direction in the heat treatment apparatus. An example of a method for applying a load encompasses, but is not particularly limited to, a method in which as shown in FIG. 4, a polymer film moves along a hearth 41 with a weight 42 placed on the polymer film. A lower limit to the load that is applied to the film in its thickness direction is preferably 0.1 g/cm$^2$ or more, more preferably 0.5 g/cm$^2$ or more, further more preferably 1 g/cm$^2$ or more. An upper limit to the load given to the film in its thickness direction is preferably 50 g/cm$^2$ or less, more preferably 20 g/cm$^2$ or less, further more preferably 10 g/cm$^2$ or less. With a load of 0.1 g/cm$^2$ or more, it is possible to reduce the wrinkling of the film due to shrinkage of the film through thermal decomposition. Further, with a load of 50 g/cm$^2$ or less, the film can be prevented from breaking under excess tension.

<Line Speed>

A line speed for the film during the film modification step of the present invention (hereinafter, also referred to as "line speed") means the speed at which the film is conveyed in the film modification step. The line speed is 10 cm/min or more but 500 cm/min or less, preferably 20 cm/min or more but 300 cm/min or less, more preferably 30 cm/min or more but 150 cm/min or less. In terms of productivity, the line speed is preferably 10 cm/min or more. Further, with a line speed of 500 cm/min or less, it is possible to perform uniform heat treatment in the heat treatment apparatus, thus hindering defects such as wrinkling from occurring.

<Two or More Heating Spaces>

In the film modification step of the present invention, the heat treatment is performed in two or more steps, preferably in three or more steps, further more preferably four or more steps, even more preferably five or more steps, particularly preferably six or more steps. Performing the heat treatment in two or more steps makes it possible to reduce an amount of shrinkage of the film per thermal decomposition, thereby making it difficult for the film to get wrinkles. Note that heat treatments in the respective steps are performed at different temperatures.

Note that the method of the present invention for producing the graphite film is expressed as recited in (1) below. Further, the present invention encompasses the aspects (2) through (6).

(1) A method for producing a graphite film by heat-treating a polymer film, including a film modification step for performing heat treatment at a heating rate of 5° C./min or more in a temperature range from (i) a lower limit to temperature rise being equal to or higher than a starting temperature of thermal decomposition of the polymer film to (ii) an upper limit to temperature rise being equal to or lower than an intermediate temperature of thermal decomposition of the polymer film; and thereafter performing heat treatment at a temperature of 2000° C. or higher.

(2) The method described in (1), further including, following the film modification step: performing cooling at a cooling rate of 10° C./min or more in a temperature range from (i) the upper limit to temperature rise to (ii) a temperature being equal to or lower than the starting temperature of thermal decomposition of the polymer film.

(3) The method described in (1) or (2), wherein: the polymer film has a weight loss rate of 1.1% or more but 42.5% or less as a result of the film modification step.

(4) The method described in any one of (1) through (3), wherein: the polymer film has a birefringence of less than 0.13, and the polymer film has a weight loss rate of 1.1% or more but 38.0% or less as a result of the film modification step.

(5) The method described in any one of (1) through (3), wherein: the polymer film has a birefringence of 0.13 or more, and the polymer film has a weight loss rate of 4.0% or more but 42.5% or less as a result of the film modification step.

(6) The method described in any one of (1) through (5), wherein: the film modification step is performed while the polymer film is moving through a heat treatment apparatus.

(7) The method described in (6), wherein the film modification step is performed in such a manner that the polymer film is continuously heat-treated while being given a tension in a machine direction of the heat treatment apparatus by control devices, provided upstream and downstream of the heat treatment apparatus, for controlling the tension given to the polymer film.

EXAMPLES

In the following, various examples of the present invention are explained together with some comparative examples.

<Conditions for Measurement of Various Properties>
<Properties of Film after Film Modification Step>
<Crack (Winding Test with Paper Core)>

A degree how easily the film after the film modification step cracked was evaluated. The evaluation of cracking was performed by confirming whether or not the films after the film modification step cracked when wound around five times paper cores of different diameters in an atmosphere of 23° C.

Evaluations were made according to the following criteria: A (for those films which did not crack even when wound around paper cores of a diameter of 1 inch); B (for those films which cracked when wound around paper cores of a diameter of 1 inch but did not crack when wound around paper cores of a diameter of 1.5 inches); C (for those films which cracked when wound around paper cores of a diameter of 1.5 inches but did not crack when wound around paper cores of a diameter of 2 inches); D (for those films which cracked when wound around paper cores of a diameter of 2 inches but did not crack when wound around paper cores of a diameter of 3 inches); and E (for those films which cracked even when wound around paper cores of a diameter of 3 inches).

<Cutting Test>

An attempt was made to cut a sample piece of a graphite film, which piece was 50 mm per side, into two pieces by a utility knife (manufactured by OLFA Corporation, model: Black S). Then, if such a sample piece was cut into two, the sample piece was evaluated as "good". On the other hand, if such a sample piece was not cut by the utility knife but cracked, the sample piece was evaluated as "poor". The graphite films having a weight loss rate of 3% or less could be cut by the utility knife.

<Weight Loss Rate, Rate of Retention of Weight>

In an atmosphere of 23° C., a weight loss rate of a polymer film after the film modification step and the carbonization step was measured. The weight loss rate is calculated according to the following formula:

Weight loss rate (%)=[(Initial weight of polymer film−Weight of polymer film immediately after film modification step (or weight of polymer film immediately after carbonization step)/Initial weight of polymer film]×100

The initial weight of the polymer film and the weight of the polymer film immediately after the film modification step are as defined above regarding the formula for calculating the weight loss rate. The weight of the polymer film immediately after the carbonization step is the weight of the polymer film as measured at 23° C. after the polymer film has been allowed to stand in an atmosphere of constant 23° C. for 24 hours immediately after the carbonization step.

A rate of retention of weight is calculated according to the following formula:

Rate of retention of weight (%)=100−Weight loss rate (%)

<Total Transmittance>

A total transmittance of a polymer film after the film modification step was measured in an atmosphere of 23° C. by use of a haze meter available from Nippon Denshoku Industries Co., Ltd. (model: NDH-300A). Such measurement was performed three times for each polymer film, and an average of the results was shown in a corresponding one of Tables 1, 3, and 5.

<Evaluation of Productivity in Graphitization Step>

In order to evaluate the productivity in the graphitization step, an upper limit to the heating rate allowing uniform foaming was checked in Examples and Comparative Examples. Specifically, in Examples and Comparative Examples, the following procedure was performed: The film having been subjected to the processes up to the graphitization step was cut into pieces of 5 cm per side. Such the pieces and pieces of a natural graphite sheet having a thickness of 200 μm were alternately stacked. Then, the resulting stack was subjected to a graphitization process at temperatures up to 2900° C. at a heating rate of 0.5° C./min, 0.6° C./min, 0.75° C./min, 1° C./min, 1.5° C./min, 2° C./min, 3° C./min, 5° C./min, 7.5° C./min, or 10° C./min. Thereafter, there found an upper limit to the heating rate allowing production of the film free from (i) peeling from a surface (like peeling from a surface 12 shown in FIG. 1) or (ii) a bump of 0.5 mm or more (like a bump 11 shown in FIG. 1). Evaluations were made as follows: A (for those films free from the peeling from the surface or the bump at heating rates for graphitization of 5° C./min or less, 7.5° C./min or less, and 10° C./min or less); B (for those films free from the peeling from the surface or the bump at heating rates for graphitization of 2° C./min or less and 3° C./min or less); C (for those films free from the peeling from the surface or the bump at a heating rate for graphitization of 1° C./min or less); D (for those films free from the peeling from the surface or the bump at heating rates for graphitization of 0.5° C./min or less, 0.6° C./min or less, and 0.75° C./min or less); and E (for those films having the peeling from the surface and the bump even at a heating rate for graphitization of 0.5° C./min or less).

<Properties of Graphite Film>

<Evaluation of Peeling from Surface>

In Examples and Comparative Examples, the number of graphite particles generated from a graphite film produced through graphitization performed at temperatures up to 2900° C. at a heating rate of 2° C./min was counted. Specifically, the graphite film was cut into a piece of 30 mm per side, and a polyimide film (Kaneka's polyimide film APICAL AH: 50 μm) was cut into a piece of 50 mm per side. Then, the piece of the graphite film and the piece of the polyimide film were stacked and pressure-bonded to each other on a flat table by a roller with a mass of 2 kg (described in ISO/DIS 2411). Thereafter, the graphite film was separated from the polyimide film, and the polyimide film was visually checked for graphite particles having a long axis of 0.1 mm or more. Evaluations were made as follows: A (for those graphite films each of which generated less than two such graphite particles); B (for those graphite films each of which generated two or more but less than five such particles); C (for those graphite films each of which generated five or more but less than 10 such particles); D (for those graphite films each of which generated 10 or more but less than 20 such particles); and E (for those graphite films each of which generated 20 or more such particles).

<Wrinkling of Graphite Film>

Figure 5:
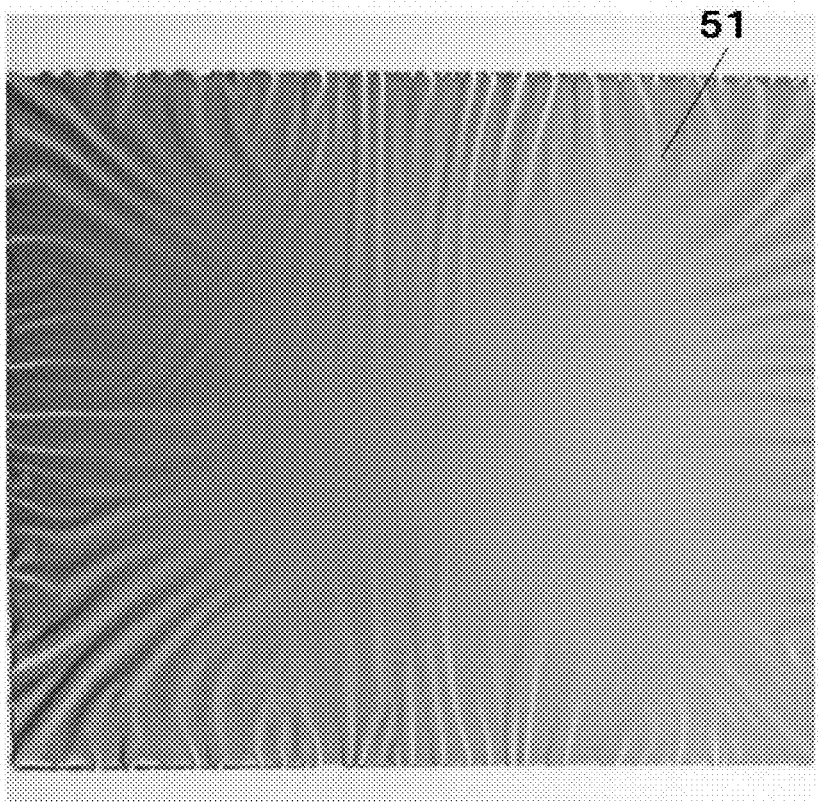
FIG. 5 is a photograph showing wrinkles of a graphite film.
Figure 6:
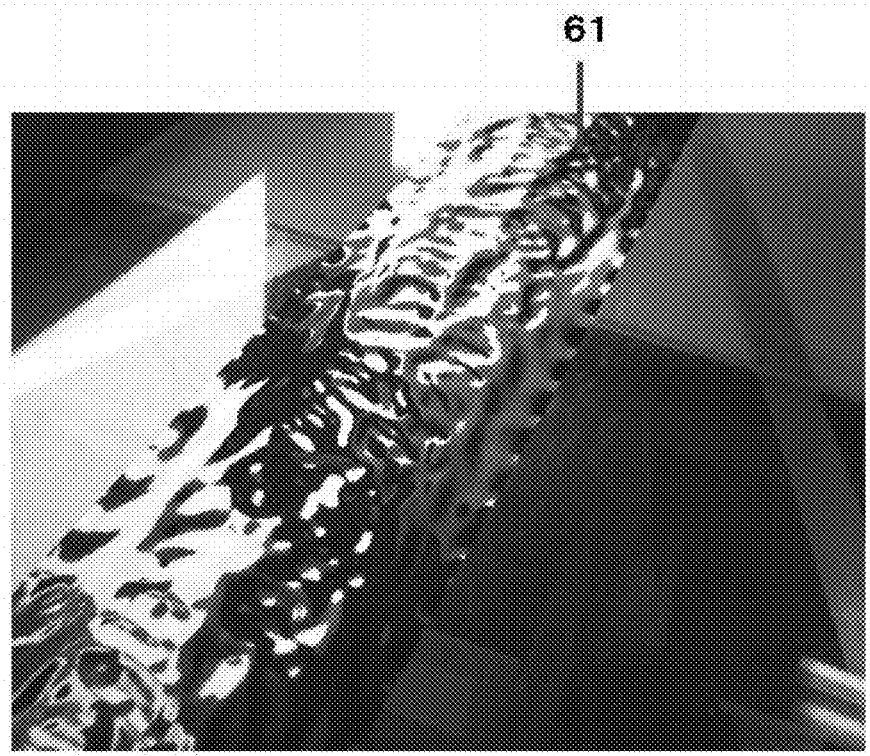
FIG. 6 is a photograph showing wrinkles which were created on a polymer film as a result of heat treatment performed until a decomposition reaction of the polymer film was completed.

A level of wrinkling occurred in each graphite film was evaluated. Evaluations were made as follows: A (for those graphite films each having no such wrinkle extending from the edge of the film by 5 mm or longer as shown in FIG. 5); B (for those graphite films each having one or more but less than two such wrinkles); C (for those graphite films each having two or more but less than three such wrinkles); D (for those graphite films each having three or more but less than five such wrinkles); and E (for those graphite films each having five or more such wrinkles).

<Folding Endurance Test (MIT Folding Endurance Test)>

Flexibility of each graphite film was tested by the MIT folding endurance test. Specifically, flexibility of a test piece of the graphite film having a size of 15 mm×100 mm was tested by use of MIT type folding endurance tester D (manufactured by Toyo Seiki Seisaku-sho Ltd.), where a test load was set at 100 gf (0.98 N), a speed was set at 90 times/min, and a folding clamp with a curvature radius (R) of 2 mm was used. In an atmosphere of 23° C., the test piece was folded to the right and the left both at an angle of 135 degrees. The number of times of the folding until the test piece was broken away was counted. Evaluations were made as follows: A (for those graphite films broken away after being folded 10000 or more times); B (for those graphite films broken away after being folded 5000 or more but less than 10000 times); C (for those graphite films broken away after being folded 1000 or more but less than 5000 times); D (for those graphite films broken away after being folded 100 or more but less than 1000 times); and E (for those graphite films broken away after being folded less than 100 times).

<Measurement of Thermal Diffusivity>

A thermal diffusivity of each graphite film in a direction parallel to a surface of the graphite film was obtained by measuring a thermal diffusivity of a sample of the graphite film at 10 Hz in an atmosphere of 23° C. with use of AC calorimetric method ("LaserPit" manufactured by ULVAC-RIKO, Inc.), where the sample was prepared by cutting a 4×40 mm sample out of the graphite film. Evaluations were made as follows: A (for those graphite films having a thermal diffusivity of 8.0 $cm^2/s$ or more); B (for those graphite films having a thermal diffusivity of 7.0 $cm^2/s$ or more but less than 8.0 $cm^2/s$); C (for those graphite films having a thermal diffusivity of 6.0 $cm^2/s$ or more but less than 7.0 $cm^2/s$); D (for those graphite films having a thermal diffusivity of 5.0 $cm^2/s$ or more but less than 6.0 $cm^2/s$); and E (for those graphite films having a thermal diffusivity of less than 5.0 $cm^2/s$).

<Birefringence>

A birefringence of each polymer film was measured by use of a Metricon's refractive index/film thickness measurement system (model: 2010 Prism Coupler). Specifically, refractive indices of the polymer film were measured in TE and TM modes, respectively, with use of a light source of a wavelength 594 nm in an atmosphere of 23° C., and the value of TE-TM was obtained as the birefringence.

Example 1

As shown in FIG. 2, the film modification step was performed by setting Kaneka's polyimide film APICAL AH having a birefringence of 0.10, a thickness of 75 μm, a width of 200 mm, and a length of 10 m on a winding apparatus and continuously feeding the film through a heat treatment apparatus. The lengths of the heat treatment apparatus in its MD direction (machine direction) and its TD direction (transverse direction) were 60 cm and 30 cm, respectively. Further, an entrance into the heat treatment apparatus was set to have a temperature of 455° C., a part of the heat treatment apparatus which was away from the entrance by cm was set to have a maximum temperature (corresponding to the upper limit to temperature rise) of 555° C., and an exit from the heat treatment apparatus which was away from the maximum temperature part by 10 cm was set to have a temperature of 455° C. A linear temperature gradient as those shown by a temperature distribution 25 in the heat treatment apparatus shown in FIG. 2 was given to the inside of the heat treatment apparatus. The line speed was controlled so that the heating rate was 100° C./min and the cooling rate was 455° C./min, while an actual temperature of the polymer film was within a temperature range from 455° C. to 555° C. (in this case, the line speed was 50 cm/min).

The film was conveyed while being given a tension by a pulling strength of 30 kgf/cm². In the heat treatment apparatus, the film was conveyed through a space between graphite wigs placed above and below the film, respectively, as shown in FIG. 4. A pressure of 2 g/cm² was applied to the film in its thickness direction. The film after the film modification step was evaluated for the wrinkling and the cracking, and measured for the weight loss rate and the total light transmittance.

Next, the film after the film modification step was cut into square pieces. These square pieces and pieces of a natural graphite sheet having a thickness of 200 μm were stacked alternately, so that a stack made of 100 layers was obtained. On the stack, a graphite weight board was placed so that a load of 5 g/cm² was applied to the film. Then, the stack was set in a carbonization furnace so as to be carbonized at temperatures up to 1400° C. at a heating rate of 2° C./min.

Next, the carbonized film/graphite sheet stack after the carbonization was put into a graphitization furnace as such, and was graphitized at temperatures up to 2900° C. at a heating rate of 2° C./min. A resulting film was compressed at a pressure of 10 MPa. Then, a graphite film thus obtained was evaluated for appearance (peeling from surface), the folding endurance (MIT), and the thermal diffusivity. The results of the evaluations are shown in Tables 1 and 2.

Example 2

A graphite film was produced in the same manner as in Example 1 except for the following points: In the film modification step, the length of the furnace and the line speed were adjusted so that the maximum temperature in the heat treatment apparatus was set at 580° C., the heating rate was set at 100° C./min, and the cooling rate was set at 455° C./min. Then, various evaluations were made on the graphite film thus produced. The results of the evaluations are shown in Tables 1 and 2.

Example 3

A graphite film was produced in the same manner as in Example 1 except for the following points: In the film modification step, the length of the furnace and the line speed were adjusted so that the maximum temperature in the heat treatment apparatus was set at 605° C., the heating rate was set at 100° C./min, and the cooling rate was set at 455° C./min. Then, various evaluations were made on the graphite film thus produced. The results of the evaluations are shown in Tables 1 and 2.

Example 4

A graphite film was produced in the same manner as in Example 1 except for the following points: In the film modification step, the length of the furnace and the line speed were adjusted so that the maximum temperature in the heat treatment apparatus was set at 630° C., the heating rate was set at 100° C./min, and the cooling rate was set at 45° C./min. Then, various evaluations were made on the graphite film thus produced. The results of the evaluations are shown in Tables 1 and 2.

Example 5

A graphite film was produced in the same manner as in Example 1 except for the following points: In the film modification step, the length of the furnace and the line speed were adjusted so that the maximum temperature in the heat treatment apparatus was set at 655° C., the heating rate was set at 100° C./min, and the cooling rate was set at 455° C./min. Then, various evaluations were made on the graphite film thus produced. The results of the evaluations are shown in Tables 1 and 2.

Example 6

A graphite film was produced in the same manner as in Example 1 except for the following points: In the film modification step, the length of the furnace and the line speed were adjusted so that the maximum temperature in the heat treatment apparatus was set at 700° C., the heating rate was set at 100° C./min, and the cooling rate was set at 455° C./min. Then, various evaluations were made on the graphite film thus produced. The results of the evaluations are shown in Tables 1 and 2.

Example 7

A graphite film was produced in the same manner as in Example 1 except for the following points: In the film modification step, the length of the furnace and the line speed were adjusted so that the temperatures of the entrance and the exit of the heat treatment apparatus were each set at 25° C. (RT), the maximum temperature in the heat treatment apparatus was set at 580° C., the heating rate was set at 100° C./min, and the cooling rate was set at 455° C./min. Then, various evaluations were made on the graphite film thus produced. The results of the evaluations are shown in Tables 1 and 2.

Example 8

A graphite film was produced in the same manner as in Example 1 except for the following points: In the film modification step, the length of the furnace and the line speed were adjusted so that the maximum temperature in the heat treatment apparatus was set at 580° C., the heating rate was set at 300° C./min, and the cooling rate was set at 455° C./min. Then, various evaluations were made on the graphite film thus produced. The results of the evaluations are shown in Tables 1 and 2.

Example 9

A graphite film was produced in the same manner as in Example 1 except for the following points: In the film modification step, the length of the furnace and the line speed were adjusted so that the maximum temperature in the heat treatment apparatus was set at 580° C., the heating rate was set at 50° C./min, and the cooling rate was set at 455° C./min. Then, various evaluations were made on the graphite film thus produced. The results of the evaluations are shown in Tables 1 and 2.

Example 10

A graphite film was produced in the same manner as in Example 1 except for the following points: In the film modification step, the length of the furnace and the line speed were adjusted so that the maximum temperature in the heat treatment apparatus was set at 580° C., the heating rate was set at 10° C./min, and the cooling rate was set at 455° C./min. Then, various evaluations were made on the graphite film thus produced. The results of the evaluations are shown in Tables 1 and 2.

Example 11

A graphite film was produced in the same manner as in Examples 1 and 2 except for the following points: In the film modification step, the length of the furnace and the line speed were adjusted so that the maximum temperature in the heat treatment apparatus was set at 580° C., the heating rate was set at 5° C./min, and the cooling rate was set at 455° C./min. Then, various evaluations were made on the graphite film thus produced. The results of the evaluations are shown in Table 1.

Example 12

A graphite film was produced in the same manner as in Example 1 except for the following points: In the film modification step, the length of the furnace and the line speed were adjusted so that the maximum temperature in the heat treatment apparatus was set at 580° C., the heating rate was set at 100° C./min, and the cooling rate was set at 300° C./min. Then, various evaluations were made on the graphite film thus produced. The results of the evaluations are shown in Tables 1 and 2.

Example 13

A graphite film was produced in the same manner as in Example 1 except for the following points: In the film modification step, the length of the furnace and the line speed were adjusted so that the maximum temperature in the heat treatment apparatus was set at 580° C., the heating rate was set at 100° C./min, and the cooling rate was set at 100° C./min. Then, various evaluations were made on the graphite film thus produced. The results of the evaluations are shown in Tables 1 and 2.

Example 14

A graphite film was produced in the same manner as in Example 1 except for the following points: In the film modification step, the length of the furnace and the line speed were adjusted so that the maximum temperature in the heat treatment apparatus was set at 580° C., the heating rate was set at 100° C./min, and the cooling rate was set at 50° C./min. Then, various evaluations were made on the graphite film thus produced. The results of the evaluations are shown in Tables 1 and 2.

Example 15

A graphite film was produced in the same manner as in Example 1 except for the following points: In the film modification step, the length of the furnace and the line speed were adjusted so that the maximum temperature in the heat treatment apparatus was set at 580° C., the heating rate was set at 100° C./min, and the cooling rate was set at 10° C./min. Then, various evaluations were made on the graphite film thus produced. The results of the evaluations are shown in Tables 1 and 2.

Example 16

Pieces of Kaneka's polyimide film APICAL AH having a birefringence of 0.10, a thickness of 75 μm, and a size of 200 mm per side and pieces of a natural graphite sheet having a thickness of 200 μm were stacked alternately, so that a stack made of 100 layers was obtained. On the stack, a graphite weight board was placed so that a load of 5 g/cm$^2$ was applied to the film. Then, the stack was conveyed through the heat treatment apparatus by use of a graphite conveyor belt. In this manner, the film modification step was performed. The cooling rate in the cooling performed after the heat treatment was 50° C./min. Except for these, a graphite film was produced under the same conditions as in Example 2. Then, various evaluations were made on the graphite film thus produced. The results of the evaluations are shown in Tables 1 and 2.

Example 17

Pieces of Kaneka's polyimide film APICAL AH having a birefringence of 0.10, a thickness of 75 μm, and a size of 200 mm per side and pieces of a natural graphite sheet having a thickness of 200 μm were stacked alternately, so that a stack made of 100 layers was obtained. On the stack, a graphite weight board was placed so that a load of 5 g/cm$^2$ was applied to the film. Then, the stack was set in the heat treatment apparatus, so that the film modification step was performed through the batch wise process with a heating rate of 100° C./min and a cooling rate of 10° C./min in a temperature range from 455° C. to 580° C. Except for these, a graphite film was produced under the same conditions as in Example 2. Then, various evaluations were made on the graphite film thus produced. The results of the evaluations are shown in Tables 1 and 2.

Example 18

A graphite film was produced in the same manner as in Example 3 except that Kaneka's polyimide film APICAL NPI having a birefringence of 0.14 and a thickness of 75 μm was used. Then, various evaluations were made on the graphite film thus produced. The results of the evaluations are shown in Tables 3 and 4.

Example 19

A graphite film was produced in the same manner as in Example 18 except for the following points: In the film modification step, the length of the furnace and the line speed were adjusted so that the maximum temperature in the heat treatment apparatus was set at 630° C., the heating rate was set at 100° C./min, and the cooling rate was set at 455° C./min. Then, various evaluations were made on the graphite film thus produced. The results of the evaluations are shown in Tables 3 and 4.

Example 20

A graphite film was produced in the same manner as in Example 18 except for the following points: In the film modification step, the length of the furnace and the line speed were adjusted so that the maximum temperature in the heat treatment apparatus was set at 655° C., the heating rate was set at 100° C./min, and the cooling rate was set at 455° C./min. Then, various evaluations were made on the graphite film thus produced. The results of the evaluations are shown in Tables 3 and 4.

Example 21

A graphite film was produced in the same manner as in Example 18 except for the following points: In the film modification step, the length of the furnace and the line speed were adjusted so that the maximum temperature in the heat treatment apparatus was set at 700° C., the heating rate was set at 100° C./min, and the cooling rate was set at 455° C./min. Then, various evaluations were made on the graphite film thus produced. The results of the evaluations are shown in Tables 3 and 4.

Example 22

A graphite film was produced in the same manner as in Example 18 except for the following points: In the film modification step, the length of the furnace and the line speed were adjusted so that the temperatures of the entrance and the exit of the heat treatment apparatus were each set at 25° C. (RT), the maximum temperature in the heat treatment apparatus was set at 630° C., the heating rate was set at 100° C./min, and the cooling rate was set at 455° C./min. Then, various evaluations were made on the graphite film thus produced. The results of the evaluations are shown in Tables 3 and 4.

Example 23

A graphite film was produced in the same manner as in Example 18 except for the following points: In the film modification step, the length of the furnace and the line speed were adjusted so that the maximum temperature in the heat treatment apparatus was set at 630° C., the heating rate was set at 300° C./min, and the cooling rate was set at 455° C./min. Then, various evaluations were made on the graphite film thus produced. The results of the evaluations are shown in Tables 3 and 4.

Example 24

A graphite film was produced in the same manner as in Example 18 except for the following points: In the film modification step, the length of the furnace and the line speed were adjusted so that the maximum temperature in the heat treatment apparatus was set at 630° C., the heating rate was set at 50° C./min, and the cooling rate was set at 455° C./min. Then, various evaluations were made on the graphite film thus produced. The results of the evaluations are shown in Tables 3 and 4.

Example 25

A graphite film was produced in the same manner as in Example 18 except for the following points: In the film modification step, the length of the furnace and the line speed were adjusted so that the maximum temperature in the heat treatment apparatus was set at 630° C., the heating rate was set at 10° C./min, and the cooling rate was set at 455° C./min. Then, various evaluations were made on the graphite film thus produced. The results of the evaluations are shown in Tables 3 and 4.

Example 26

A graphite film was produced in the same manner as in Example 18 except for the following points: In the film modification step, the length of the furnace and the line speed were adjusted so that the maximum temperature in the heat treatment apparatus was set at 630° C., the heating rate was set at 5° C./min, and the cooling rate was set at 455° C./min. Then, various evaluations were made on the graphite film thus produced. The results of the evaluations are shown in Tables 3 and 4.

Example 27

A graphite film was produced in the same manner as in Example 18 except for the following points: In the film modification step, the length of the furnace and the line speed were adjusted so that the maximum temperature in the heat treatment apparatus was set at 630° C., the heating rate was set at 100° C./min, and the cooling rate was set at 300° C./min. Then, various evaluations were made on the graphite film thus produced. The results of the evaluations are shown in Tables 3 and 4.

Example 28

A graphite film was produced in the same manner as in Example 18 except for the following points: In the film modification step, the length of the furnace and the line speed were adjusted so that the maximum temperature in the heat treatment apparatus was set at 630° C., the heating rate was set at 100° C./min, and the cooling rate was set at 100° C./min. Then, various evaluations were made on the graphite film thus produced. The results of the evaluations are shown in Tables 3 and 4.

Example 29

A graphite film was produced in the same manner as in Example 18 except for the following points: In the film modification step, the length of the furnace and the line speed were adjusted so that the maximum temperature in the heat treatment apparatus was set at 630° C., the heating rate was set at 100° C./min, and the cooling rate was set at 50° C./min. Then, various evaluations were made on the graphite film thus produced. The results of the evaluations are shown in Tables 3 and 4.

Example 30

A graphite film was produced in the same manner as in Example 18 except for the following points: In the film modification step, the length of the furnace and the line speed were adjusted so that the maximum temperature in the heat treatment apparatus was set at 630° C., the heating rate was set at 100° C./min, and the cooling rate was set at 10° C./min. Then, various evaluations were made on the graphite film thus produced. The results of the evaluations are shown in Tables 3 and 4.

Example 31

A graphite film was produced in the same manner as in Example 16 except for the following points: Kaneka's polyimide film APICAL NPI having a birefringence of 0.14 and a thickness of 75 µm was used; In the film modification step, the length of the furnace and the line speed were adjusted so that the maximum temperature in the heat treatment apparatus was set at 630° C. and the heating rate was set at 100° C./min. Then, various evaluations were made on the graphite film thus produced. The results of the evaluations are shown in Tables 3 and 4. In Example 31, the cooling rate in the cooling performed after the heat treatment was 50° C./min.

Example 32

A graphite film was produced in the same manner as in Example 17 except for the following points: Kaneka's polyimide film APICAL NPI having a birefringence of 0.14 and a thickness of 75 µm was used; The film modification step was performed through the batch-wise process with a heating rate of 100° C./min and a cooling rate of 10° C./min in a temperature range from 455° C. to 630° C. Then, various evaluations were made on the graphite film thus produced. The results of the evaluations are shown in Tables 3 and 4.

Example 33

A graphite film way red in the same manner as in Example 3 except that Kaneka's polyimide film APICAL NPI having a birefringence of 0.14 and a thickness of 125 µm was used. Then, various evaluations were made on the graphite film thus produced. The results of the evaluations are shown in Tables 3 and 4.

Example 34

A graphite film was produced in the same manner as in Example 33 except for the following points: In the film modification step, the length of the furnace and the line speed were adjusted so that the maximum temperature in the heat treatment apparatus was set at 630° C., the heating rate was set at 100° C./min, and the cooling rate was set at 455° C./min. Then, various evaluations were made on the graphite film thus produced. The results of the evaluations are shown in Tables 3 and 4.

Example 35

A graphite film was produced in the same manner as in Example 33 except for the following points: In the film modification step, the length of the furnace and the line speed were adjusted so that the maximum temperature in the heat treatment apparatus was set at 655° C., the heating rate was set at 100° C./min, and the cooling rate was set at 455° C./min. Then, various evaluations were made on the graphite film thus produced. The results of the evaluations are shown in Tables 3 and 4.

Example 36

A graphite film was produced in the same manner as in Example 33 except for the following points: In the film modification step, the length of the furnace and the line speed were adjusted so that the maximum temperature in the heat treatment apparatus was set at 700° C., the heating rate was set at 100° C./min, and the cooling rate was set at 455° C./min. Then, various evaluations were made on the graphite film thus produced. The results of the evaluations are shown in Tables 3 and 4.

Example 37

A graphite film was produced in the same manner as in Example 31 except that Kaneka's polyimide film APICAL NPI having a birefringence of 0.14 and a thickness of 125 µm was used. Then, various evaluations were made on the graphite film thus produced. The results of the evaluations are shown in Tables 3 and 4.

Example 38

A graphite film was produced in the same manner as in Example 32 except that Kaneka's polyimide film APICAL NPI having a birefringence of 0.14 and a thickness of 125 µm was used. Then, various evaluations were made on the graphite film thus produced. The results of the evaluations are shown in Tables 3 and 4.

Example 39

A graphite film was produced in the same manner as in Example 2 except that after the film modification step, the graphitization step was performed without performing the carbonization step. Then, various evaluations were made on the graphite film thus produced. Namely, the film after the film modification step was cut into square pieces, and these square pieces and pieces of a natural graphite sheet having a thickness of 200 µm were stacked alternately so that a stack made of 100 layers was obtained. On the stack, a graphite weight board was placed so that a load of 5 g/cm$^2$ was applied to the film. Then, the stack was set in a graphite furnace, and was graphitized at temperatures up to 2900° C. at a heating rate of 2° C./min. The results of the evaluations are shown in Tables 5 and 6.

Example 40

Figure 7:
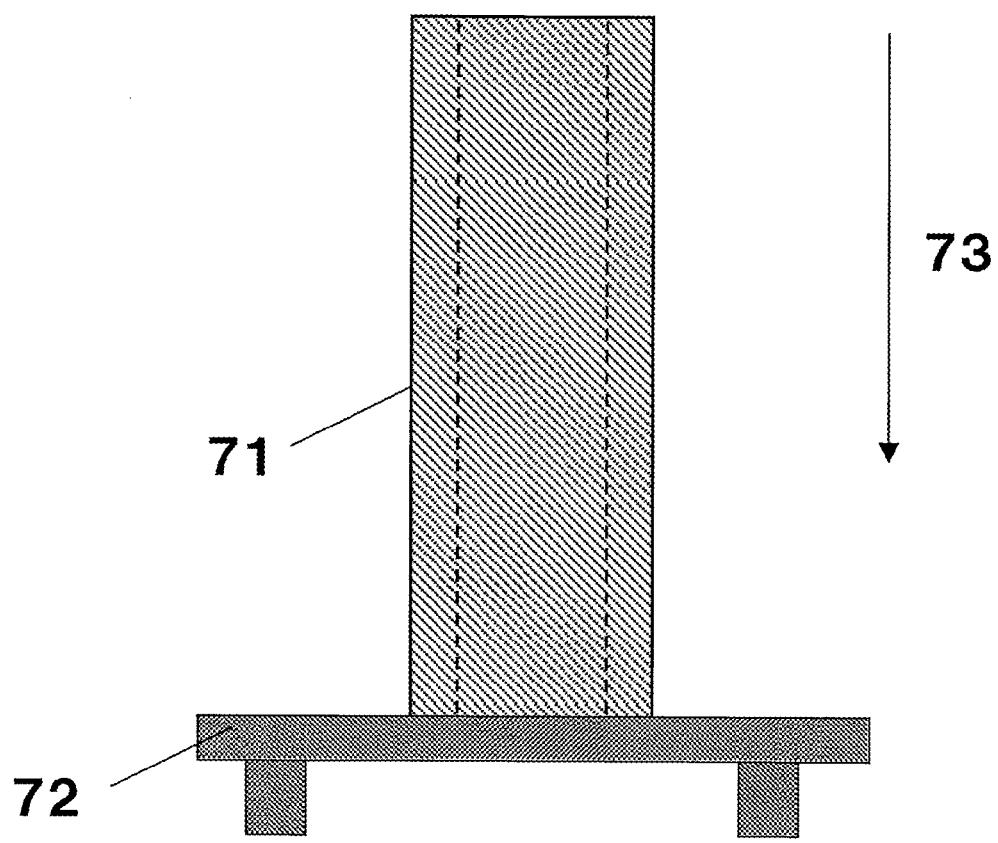
FIG. 7 is a schematic view showing a method for setting a polymer film.

A graphite film was produced in the same manner as in Example 2 except that the carbonization and graphitization steps were performed with the polymer film shaped in a roll (circular cylinder). Then, various evaluations were made on the graphite film thus produced. Namely, (1) the polymer film after the film modification step was not cut but was rolled up so as to be in a roll (circular cylinder) shape; then, the rolled-up polymer film was put into the carbonization furnace in such a manner that its TD direction (transverse direction) coincides vertical direction as shown in FIG. 7. (2) The polymer film after the carbonization step was put into the graphitization furnace with the polymer film being in the same shape as that when put into the carbonization furnace, so as to be graphitized at temperatures up to 2900° C. at a heating rate of 2° C./min. The results of the evaluations are shown in Tables 5 and 6.

Example 41

A graphite film was produced in the same manner as in Example 39 except that the polymer film after the film modification step was not cut but was rolled up so as to be in a roll (circular cylinder) shape; then, the rolled-up polymer film was put into the graphitization furnace in such a manner that its TD direction (transverse direction) coincides with a vertical direction as shown in FIG. 7. Then, various evaluations were made on the graphite film thus produced. The results of the evaluations are shown in Tables 5 and 6.

Example 42

A graphite film was produced in the same manner as in Example 2 except that Kapton H (available from Du Pont-Toray Co., Ltd.) having a thickness of 75 μm was used. Then, various evaluations were made on the graphite film thus produced. The results of the evaluations are shown in Tables 5 and 6.

Example 43

A graphite film was produced in the same manner as in Example 2 except that POD (polyparaphenylene oxadiazole) having a thickness of 75 μm was used as a polymer film. Then, various evaluations were made on the graphite film thus produced. The results of the evaluations are shown in Tables 5 and 6.

Comparative Example 1

A graphite film was produced in the same manner as in Example 1 except that the film modification step was not performed. Then, various evaluations were made on the graphite film thus produced. The results of the evaluations are shown in Tables 7 and 8.

Comparative Example 2

A graphite film was produced in the same manner as in Comparative Example 1 except that the heating rate for carbonization was set at 5° C./min. Then, various evaluations were made on the graphite film thus produced. The results of the evaluations are shown in Tables 7 and 8.

Comparative Example 3

A graphite film was produced in the same manner as in Example 1 except for the following points: In the film modification step, the length of the furnace and the line speed were adjusted so that the maximum temperature in the heat treatment apparatus was set at 1400° C., the heating rate was set at 100° C./min, and the cooling rate was set at 455° C./min. Then, various evaluations were made on the graphite film thus produced. The results of the evaluations are shown in Tables 7 and 8.

Comparative Example 4

A graphite film was produced in the same manner as in Example 1 except for the following points: In the film modification step, the length of the furnace and the line speed were adjusted so that the maximum temperature in the heat treatment apparatus was set at 580° C., the heating rate was set at 2° C./min, and the cooling rate was set at 455° C./min. Then, various evaluations were made on the graphite film thus produced. The results of the evaluations are shown in Tables 7 and 8.

Comparative Example 5

A graphite film was produced in the same manner as in Example 1 except for the following points: In the film modification step, the length of the furnace and the line speed were adjusted so that the maximum temperature in the heat treatment apparatus was set at 580° C., the heating rate was set at 100° C./min, and the cooling rate was set at 2° C./min. Then, various evaluations were made on the graphite film thus produced. The results of the evaluations are shown in Tables 7 and 8.

Comparative Example 6

A graphite film was produced in the same manner as in Example 32 except that the film modification step was not performed. Then, various evaluations were made on the graphite film thus produced. The results of the evaluations are shown in Tables 7 and 8.

Comparative Example 7

A graphite film was produced in the same manner as in Comparative Example 6 except that the heating rate for carbonization was set at 5° C./min. Then, various evaluations were made on the graphite film thus produced. The results of the evaluations are shown in Tables 7 and 8.

Comparative Example 8

A graphite film was produced in the same manner as in Example 18 except for the following points: In the film modification step, the length of the furnace and the line speed were adjusted so that the maximum temperature in the heat treatment apparatus was set at 1400° C., the heating rate was set at 100° C./min, and the cooling rate was set at 455° C./min. Then, various evaluations were made on the graphite film thus produced. The results of the evaluations are shown in Tables 7 and 8.

Comparative Example 9

A graphite film was produced in the same manner as in Example 18 except for the following points: In the film modification step, the length of the furnace and the line speed were adjusted so that the maximum temperature in the heat treatment apparatus was set at 630° C., the heating rate was set at 2° C./min, and the cooling rate was set at 455° C./min. Then, various evaluations were made on the graphite film thus produced. The results of the evaluations are shown in Tables 7 and 8.

Comparative Example 10

A graphite film was produced in the same manner as in Example 18 except for the following points: In the film modification step, the length of the furnace and the line speed were adjusted so that the maximum temperature in the heat treatment apparatus was set at 630° C., the heating rate was set at 100° C./min, and the cooling rate was set at 2° C./min. Then, various evaluations were made on the graphite film thus produced. The results of the evaluations are shown in Tables 7 and 8.

Comparative Example 11

A graphite film was produced in the same manner as in Example 38 except that the film modification step was not performed. Then, various evaluations were made on the graphite film thus produced. The results of the evaluations are shown in Tables 7 and 8.

Comparative Example 12

A graphite film was produced in the same manner as in Comparative Example 11 except that the heating rate for carbonization was set at 5° C./min. Then, various evaluations were made on the graphite film thus produced. The results of the evaluations are shown in Tables 7 and 8.

Comparative Example 13

A graphite film was produced in the same manner as in Example 33 except for the following points: In the film modification step, the length of the furnace and the line speed were adjusted so that the maximum temperature in the heat treatment apparatus was set at 1400° C., the heating rate was set at 100° C./min, and the cooling rate was set at 455° C./min. Then, various evaluations were made on the graphite film thus produced. The results of the evaluations are shown in Tables 7 and 8.

Comparative Example 14

According to Example 1 of Patent Literature 2, an experiment was performed. A graphite film was produced in the same manner as in Comparative Example 1 except for the following points: As a raw material, a polyimide film (product name: Kapton available from Du Pont-Toray Co., Ltd.) having a birefringence of 0.10, a thickness of 75 μm, and a size of 200 mm per side was used; The carbonization was performed at temperatures up to 1600° C. at a heating rate of 1° C./min, and the graphitization was performed at temperatures up to 2700° C. at a heating rate of 3° C./min. Then, various evaluations were made on the graphite film thus produced.

Comparative Example 15

A graphite film was produced in the same manner as in Comparative Example 14 except that the carbonization was performed at temperatures up to 1600° C. at a heating rate of 5° C./min. Then, various evaluations were made on the graphite film thus produced.

Comparative Example 16

A graphite film was produced in the same manner as in Comparative Example 14 except that the carbonization was performed at temperatures up to 1600° C. at a heating rate of 20° C./min. Then, various evaluations were made on the graphite film thus produced.

TABLE 1

| | Raw material | | | | | Film modification step | | | | |
| --- | --- | --- | --- | --- | --- | --- | --- | --- | --- | --- |
| | Type | Thickness μm | Width mm | Length m | Birefringence | Heat treatment method | Start temp. ° C. | Max. temp. ° C. | Heating rate ° C./min | Cooling rate ° C./min |
| Ex. 1 | Apical AH | 75 | 200 | 10 | 0.10 | CLFPP* | 455 | 555 | 100 | 455 |
| Ex. 2 | Apical AH | 75 | 200 | 10 | 0.10 | CLFPP* | 455 | 580 | 100 | 455 |
| Ex. 3 | Apical AH | 75 | 200 | 10 | 0.10 | CLFPP* | 455 | 605 | 100 | 455 |
| Ex. 4 | Apical AH | 75 | 200 | 10 | 0.10 | CLFPP* | 455 | 630 | 100 | 455 |
| Ex. 5 | Apical AH | 75 | 200 | 10 | 0.10 | CLFPP* | 455 | 655 | 100 | 455 |
| Ex. 6 | Apical AH | 75 | 200 | 10 | 0.10 | CLFPP* | 455 | 700 | 100 | 455 |
| Ex. 7 | Apical AH | 75 | 200 | 10 | 0.10 | CLFPP* | RT | 580 | 100 | 455 |
| Ex. 8 | Apical AH | 75 | 200 | 10 | 0.10 | CLFPP* | 455 | 580 | 300 | 455 |
| Ex. 9 | Apical AH | 75 | 200 | 10 | 0.10 | CLFPP* | 455 | 580 | 50 | 455 |
| Ex. 10 | Apical AH | 75 | 200 | 10 | 0.10 | CLFPP* | 455 | 580 | 10 | 455 |
| Ex. 11 | Apical AH | 75 | 200 | 10 | 0.10 | CLFPP* | 455 | 580 | 5 | 455 |
| Ex. 12 | Apical AH | 75 | 200 | 10 | 0.10 | CLFPP* | 455 | 580 | 100 | 300 |
| Ex. 13 | Apical AH | 75 | 200 | 10 | 0.10 | CLFPP* | 455 | 580 | 100 | 100 |
| Ex. 14 | Apical AH | 75 | 200 | 10 | 0.10 | CLFPP* | 455 | 580 | 100 | 50 |
| Ex. 15 | Apical AH | 75 | 200 | 10 | 0.10 | CLFPP* | 455 | 580 | 100 | 10 |
| Ex. 16 | Apical AH | 75 | 200 | 0.2 | 0.10 | CPC** | 455 | 580 | 100 | 50 |
| Ex. 17 | Apical AH | 75 | 200 | 0.2 | 0.10 | BPC*** | 455 | 580 | 100 | 10 |

| | Properties of film after film modification step | | | | |
| --- | --- | --- | --- | --- | --- |
| | Cracking (winding test with paper core) | Cutting test | Rate of retention of weight % | Weight loss rate % | Total transmittance % |
| Ex. 1 | A | Good | 98.8 | 1.2 | 5.50 |
| Ex. 2 | A | Good | 97.2 | 2.8 | 0.20 |
| Ex. 3 | A | Poor | 85.0 | 15.0 | 0.03 |
| Ex. 4 | B | Poor | 73.5 | 26.5 | — |
| Ex. 5 | C | Poor | 70.0 | 30.0 | — |
| Ex. 6 | D | Poor | 62.0 | 38.0 | — |
| Ex. 7 | A | Poor | 97.2 | 2.8 | 0.20 |
| Ex. 8 | A | Poor | 97.2 | 2.8 | 0.20 |
| Ex. 9 | A | Poor | 97.2 | 2.8 | 0.20 |
| Ex. 10 | A | Poor | 97.2 | 2.8 | 0.20 |
| Ex. 11 | A | Poor | 97.2 | 2.8 | 0.20 |
| Ex. 12 | A | Poor | 97.2 | 2.8 | 0.20 |
| Ex. 13 | A | Poor | 97.2 | 2.8 | 0.20 |
| Ex. 14 | A | Poor | 97.2 | 2.8 | 0.20 |
| Ex. 15 | A | Poor | 97.2 | 2.8 | 0.20 |
| Ex. 16 | B | Poor | 97.2 | 2.8 | 0.20 |
| Ex. 17 | B | Poor | 97.2 | 2.8 | 0.20 |

*"CLFPP" stands for "continuous long film producing process".
**"CPC" stands for "continuous process with container".
***"BPC" stands for "batch-wise process with container".

TABLE 2

| | Carbonization step | | | | Graphitization step | | | | Evaluation of productivity in graphitization, heating rate allowing uniform foaming | | Properties of graphite film | | | |
|---|---|---|---|---|---|---|---|---|---|---|---|---|---|---|
| | Heat treatment method | Max. temp. °C. | Heating rate °C./min | Rate of retention of weight % | Heat treatment method | Max. temp. °C. | Heating rate °C./min | | °C./min | Eval. | Peeling from surface | Wrinkling | MIT times | Thermal diffusivity cm²/s |
| Ex. 1 | Sheet stack | 1400 | 2 | 50.0 | Sheet stack | 2900 | 2 | | 1 | C | C | A | C | C |
| Ex. 2 | Sheet stack | 1400 | 2 | 50.0 | Sheet stack | 2900 | 2 | | 5 | A | A | A | A | A |
| Ex. 3 | Sheet stack | 1400 | 2 | 50.0 | Sheet stack | 2900 | 2 | | >10 | A | A | A | A | A |
| Ex. 4 | Sheet stack | 1400 | 2 | 50.0 | Sheet stack | 2900 | 2 | | >10 | A | A | A | B | B |
| Ex. 5 | Sheet stack | 1400 | 2 | 50.0 | Sheet stack | 2900 | 2 | | >10 | A | A | B | C | C |
| Ex. 6 | Sheet stack | 1400 | 2 | 50.0 | Sheet stack | 2900 | 2 | | >10 | A | A | C | D | D |
| Ex. 7 | Sheet stack | 1400 | 2 | 50.0 | Sheet stack | 2900 | 2 | | 5 | A | A | A | A | A |
| Ex. 8 | Sheet stack | 1400 | 2 | 50.0 | Sheet stack | 2900 | 2 | | 5 | A | A | A | A | A |
| Ex. 9 | Sheet stack | 1400 | 2 | 50.0 | Sheet stack | 2900 | 2 | | 5 | A | A | A | A | A |
| Ex. 10 | Sheet stack | 1400 | 2 | 50.0 | Sheet stack | 2900 | 2 | | 2 | B | B | A | B | B |
| Ex. 11 | Sheet stack | 1400 | 2 | 50.0 | Sheet stack | 2900 | 2 | | 1 | C | C | A | C | C |
| Ex. 12 | Sheet stack | 1400 | 2 | 50.0 | Sheet stack | 2900 | 2 | | 5 | A | A | A | A | A |
| Ex. 13 | Sheet stack | 1400 | 2 | 50.0 | Sheet stack | 2900 | 2 | | 2 | B | B | A | B | B |
| Ex. 14 | Sheet stack | 1400 | 2 | 50.0 | Sheet stack | 2900 | 2 | | 1 | C | C | A | C | C |
| Ex. 15 | Sheet stack | 1400 | 2 | 50.0 | Sheet stack | 2900 | 2 | | 0.75 | D | D | A | D | D |
| Ex. 16 | Sheet stack | 1400 | 2 | 50.0 | Sheet stack | 2900 | 2 | | 2 | B | B | B | B | B |
| Ex. 17 | Sheet stack | 1400 | 2 | 50.0 | Sheet stack | 2900 | 2 | | 1 | C | C | B | C | C |

TABLE 3

| | Raw material | | | | Film modification step | | | | |
|---|---|---|---|---|---|---|---|---|---|
| | Type | Thickness μm | Width mm | Length m | Birefringence | Heat treatment method | Start temp. °C. | Max. temp. °C. | Heating rate °C./min | Cooling rate °C./min |
| Ex. 18 | Apical NPI | 75 | 200 | 10 | 0.14 | CLFPP* | 455 | 605 | 100 | 455 |
| Ex. 19 | Apical NPI | 75 | 200 | 10 | 0.14 | CLFPP* | 455 | 630 | 100 | 455 |
| Ex. 20 | Apical NPI | 75 | 200 | 10 | 0.14 | CLFPP* | 455 | 655 | 100 | 455 |
| Ex. 21 | Apical NPI | 75 | 200 | 10 | 0.14 | CLFPP* | 455 | 700 | 100 | 455 |
| Ex. 22 | Apical NPI | 75 | 200 | 10 | 0.14 | CLFPP* | RT | 630 | 100 | 455 |
| Ex. 23 | Apical NPI | 75 | 200 | 10 | 0.14 | CLFPP* | 455 | 630 | 300 | 455 |
| Ex. 24 | Apical NPI | 75 | 200 | 10 | 0.14 | CLFPP* | 455 | 630 | 50 | 455 |
| Ex. 25 | Apical NPI | 75 | 200 | 10 | 0.14 | CLFPP* | 455 | 630 | 10 | 455 |
| Ex. 26 | Apical NPI | 75 | 200 | 10 | 0.14 | CLFPP* | 455 | 630 | 5 | 455 |
| Ex. 27 | Apical NPI | 75 | 200 | 10 | 0.14 | CLFPP* | 455 | 630 | 100 | 300 |
| Ex. 28 | Apical NPI | 75 | 200 | 10 | 0.14 | CLFPP* | 455 | 630 | 100 | 100 |
| Ex. 29 | Apical NPI | 75 | 200 | 10 | 0.14 | CLFPP* | 455 | 630 | 100 | 50 |
| Ex. 30 | Apical NPI | 75 | 200 | 10 | 0.14 | CLFPP* | 455 | 630 | 100 | 10 |
| Ex. 31 | Apical NPI | 75 | 200 | 0.2 | 0.14 | CPC** | 455 | 630 | 100 | 50 |
| Ex. 32 | Apical NPI | 75 | 200 | 0.2 | 0.14 | BPC*** | 455 | 630 | 100 | 10 |
| Ex. 33 | Apical NPI | 125 | 200 | 10 | 0.14 | CLFPP* | 455 | 605 | 100 | 455 |
| Ex. 34 | Apical NPI | 125 | 200 | 10 | 0.14 | CLFPP* | 455 | 630 | 100 | 455 |
| Ex. 35 | Apical NPI | 125 | 200 | 10 | 0.14 | CLFPP* | 455 | 655 | 100 | 455 |
| Ex. 36 | Apical NPI | 125 | 200 | 10 | 0.14 | CLFPP* | 455 | 700 | 100 | 455 |
| Ex. 37 | Apical NPI | 125 | 200 | 0.2 | 0.14 | CPC** | 455 | 630 | 100 | 50 |
| Ex. 38 | Apical NPI | 125 | 200 | 0.2 | 0.14 | EPC*** | 455 | 630 | 100 | 10 |

| | Properties of film after film modification step | | | | |
|---|---|---|---|---|---|
| | Cracking (winding test with paper core) | Cutting test | Rate of retention of weight % | Weight loss rate % | Total transmittance % |
| Ex. 18 | A | Poor | 80.0 | 20.0 | 0.03 |
| Ex. 19 | B | Poor | 70.0 | 30.0 | — |
| Ex. 20 | C | Poor | 65.7 | 34.3 | — |
| Ex. 21 | D | Poor | 62.5 | 37.5 | — |
| Ex. 22 | B | Poor | 70.0 | 30.0 | — |
| Ex. 23 | B | Poor | 70.0 | 30.0 | — |
| Ex. 24 | B | Poor | 70.0 | 30.0 | — |
| Ex. 25 | B | Poor | 70.0 | 30.0 | — |
| Ex. 26 | B | Poor | 70.0 | 30.0 | — |
| Ex. 27 | B | Poor | 70.0 | 30.0 | — |

TABLE 3-continued

|   | | | | | |
|---|---|---|---|---|---|
| Ex. 28 | B | Poor | 70.0 | 30.0 | — |
| Ex. 29 | B | Poor | 70.0 | 30.0 | — |
| Ex. 30 | B | Poor | 70.0 | 30.0 | — |
| Ex. 31 | C | Poor | 70.0 | 30.0 | — |
| Ex. 32 | C | Poor | 70.0 | 30.0 | — |
| Ex. 33 | A | Poor | 80.0 | 20.0 | 0.03 |
| Ex. 34 | B | Poor | 70.0 | 30.0 | — |
| Ex. 35 | C | Poor | 65.7 | 34.3 | — |
| Ex. 36 | D | Poor | 62.5 | 37.5 | — |
| Ex. 37 | C | Poor | 70.0 | 30.0 | — |
| Ex. 38 | C | Poor | 70.0 | 30.0 | — |

*"CLFPP" stands for "continuous long film producing process".
**"CPC" stands for "continuous process with container".
***"BPC" stands for "batch-wise process with container".

TABLE 4

| | Carbonization step | | | Graphitization step | | | Evaluation of productivity in graphitization, heating rate allowing uniform foaming | | Properties of graphite film | | | |
|---|---|---|---|---|---|---|---|---|---|---|---|---|
| | Heat treatment method | Max. temp. °C. | Heating rate °C./min | Rate of retention of weight % | Heat treatment method | Max. temp. °C. | Heating rate °C./min | °C./min | Eval. | Peeling from surface | Wrinkling | MIT times | Thermal diffusivity cm²/s |
| Ex. 18 | Sheet stack | 1400 | 2 | 50.0 | Sheet stack | 2900 | 2 | 1 | C | C | A | C | C |
| Ex. 19 | Sheet stack | 1400 | 2 | 50.0 | Sheet stack | 2900 | 2 | 2 | B | B | A | B | B |
| Ex. 20 | Sheet stack | 1400 | 2 | 50.0 | Sheet stack | 2900 | 2 | 5 | A | A | B | A | A |
| Ex. 21 | Sheet stack | 1400 | 2 | 50.0 | Sheet stack | 2900 | 2 | 7.5 | A | A | C | A | A |
| Ex. 22 | Sheet stack | 1400 | 2 | 50.0 | Sheet stack | 2900 | 2 | 2 | B | B | A | B | B |
| Ex. 23 | Sheet stack | 1400 | 2 | 50.0 | Sheet stack | 2900 | 2 | 2 | B | B | A | B | B |
| Ex. 24 | Sheet stack | 1400 | 2 | 50.0 | Sheet stack | 2900 | 2 | 2 | B | B | A | B | B |
| Ex. 25 | Sheet stack | 1400 | 2 | 50.0 | Sheet stack | 2900 | 2 | 1 | C | C | A | C | C |
| Ex. 26 | Sheet stack | 1400 | 2 | 50.0 | Sheet stack | 2900 | 2 | 0.75 | D | D | A | C | D |
| Ex. 27 | Sheet stack | 1400 | 2 | 50.0 | Sheet stack | 2900 | 2 | 2 | B | B | A | B | B |
| Ex. 28 | Sheet stack | 1400 | 2 | 50.0 | Sheet stack | 2900 | 2 | 1.5 | C | C | A | C | C |
| EX. 29 | Sheet stack | 1400 | 2 | 50.0 | Sheet stack | 2900 | 2 | 1 | C | C | A | C | C |
| Ex. 30 | Sheet stack | 1400 | 2 | 50.0 | Sheet stack | 2900 | 2 | 0.75 | D | D | A | C | D |
| Ex. 31 | Sheet stack | 1400 | 2 | 50.0 | Sheet stack | 2900 | 2 | 1.5 | C | C | D | C | C |
| Ex. 32 | Sheet stack | 1400 | 2 | 50.0 | Sheet stack | 2900 | 2 | 1 | C | C | D | C | C |
| Ex. 33 | Sheet stack | 1400 | 2 | 50.0 | Sheet stack | 2900 | 2 | 0.75 | D | D | A | C | D |
| Ex. 34 | Sheet stack | 1400 | 2 | 50.0 | Sheet stack | 2900 | 2 | 1 | C | C | A | C | C |
| Ex. 35 | Sheet stack | 1400 | 2 | 50.0 | Sheet stack | 2900 | 2 | 2 | B | B | B | B | B |
| Ex. 36 | Sheet stack | 1400 | 2 | 50.0 | Sheet stack | 2900 | 2 | 2 | B | B | C | B | B |
| Ex. 37 | Sheet stack | 1400 | 2 | 50.0 | Sheet stack | 2900 | 2 | 0.75 | D | D | D | C | D |
| Ex. 38 | Sheet stack | 1400 | 2 | 50.0 | Sheet stack | 2900 | 2 | 0.6 | D | D | D | C | D |

TABLE 5

| | Raw material | | | | | Film modification step | | | | |
|---|---|---|---|---|---|---|---|---|---|---|
| | Type | Thickness μm | Width mm | Length m | Birefringence | Heat treatment method | Start temp. °C. | Max. temp. °C. | Heating rate °C./min | Cooling rate °C./min |
| Ex. 39 | Apical AH | 75 | 200 | 10 | 0.10 | CLFPP* | 455 | 580 | 100 | 455 |
| Ex. 40 | Apical AH | 75 | 200 | 10 | 0.10 | CLFPP* | 455 | 580 | 100 | 455 |
| Ex. 41 | Apical AH | 75 | 200 | 10 | 0.10 | CLFPP* | 455 | 580 | 100 | 455 |
| Ex. 42 | Kepton H | 75 | 200 | 10 | 0.10 | CLFPP* | 455 | 580 | 100 | 455 |
| Ex. 43 | POD (polyparaphenylene oxadiazole) | 75 | 200 | 10 | 0.10 | CLFPP* | 455 | 580 | 100 | 455 |

| | Properties of film after film modification step | | | |
|---|---|---|---|---|
| | Cracking (winding test with paper core) | Cutting test | Rate of retention of weight % | Weight loss rate % | Total transmittance % |
| Ex. 39 | A | Good | 97.2 | 2.8 | 0.20 |
| Ex. 40 | A | Good | 97.2 | 2.8 | 0.20 |

TABLE 5-continued

|   |   |   |   |   |   |
|---|---|---|---|---|---|
| Ex. 41 | A | Good | 97.2 | 2.8 | 0.20 |
| Ex. 42 | A | Good | 97.0 | 3.0 | 0.22 |
| Ex. 43 | A | Good | 95.2 | 4.8 | 0.25 |

*"CLFPP" stands for "continuous long film producing process".

TABLE 6

| | Carbonization step | | | Graphitization step | | | Evaluation of productivity in graphitization, heating rate allowing uniform foaming | | Properties of graphite film | | | | |
|---|---|---|---|---|---|---|---|---|---|---|---|---|---|
| | Heat treatment method | Max. temp. °C. | Heating rate °C./min | Rate of retention of weight % | Heat treatment method | Max. temp. °C. | Heating rate °C./min | °C./min | Eval. | Peeling from surface | Wrinkling | MIT times | Thermal diffusivity cm²/s |
| Ex. 39 | None | | | | Sheet stack | 2900 | 2 | 5 | A | A | B | A | A |
| Ex. 40 | Circular cylinder | 1400 | 2 | 50.0 | Circular cylinder | 2900 | 2 | 5 | A | A | A | A | A |
| Ex. 41 | None | | | | Circular cylinder | 2900 | 2 | 5 | A | A | B | A | A |
| Ex. 42 | Sheet stack | 1400 | 2 | 50.0 | Sheet stack | 2900 | 2 | 5 | A | A | A | A | A |
| Ex. 43 | Sheet stack | 1400 | 2 | 50.0 | Sheet stack | 2900 | 2 | 5 | A | A | A | A | E |

TABLE 7

| | Raw material | | | | | Film modification step | | | | |
|---|---|---|---|---|---|---|---|---|---|---|
| | Type | Thickness μm | Width mm | Length m | Birefringence | Heat treatment method | Start temp. °C. | Max. temp. °C. | Heating rate °C./min | Cooling rate °C./min |
| Comp. Ex. 1 | Apical AH | 75 | 200 | 0.2 | 0.10 | | | None | | |
| Comp. Ex. 2 | Apical AH | 75 | 200 | 0.2 | 0.10 | | | None | | |
| Comp. Ex. 3 | Apical AH | 75 | 200 | 10 | 0.10 | CLFPP* | 455 | 1400 | 100 | 455 |
| Comp. Ex. 4 | Apical AH | 75 | 200 | 10 | 0.10 | CLFPP* | 455 | 580 | 2 | 455 |
| Comp. Ex. 5 | Apical AH | 75 | 200 | 10 | 0.10 | CLFPP* | 455 | 580 | 100 | 2 |
| Comp. Ex. 6 | Apical NPI | 75 | 200 | 0.2 | 0.14 | | | None | | |
| Comp. Ex. 7 | Apical NPI | 75 | 200 | 0.2 | 0.14 | | | None | | |
| Comp. Ex. 8 | Apical NPI | 75 | 200 | 10 | 0.14 | CLFPP* | 455 | 1400 | 100 | 455 |
| Comp. Ex. 9 | Apical NPI | 75 | 200 | 10 | 0.14 | CLFPP* | 455 | 630 | 2 | 455 |
| Comp. Ex. 10 | Apical NPI | 75 | 200 | 10 | 0.14 | CLFPP* | 455 | 630 | 100 | 2 |
| Comp. Ex. 11 | Apical NPI | 125 | 200 | 0.2 | 0.14 | | | None | | |
| Comp. Ex. 12 | Apical NPI | 125 | 200 | 0.2 | 0.14 | | | None | | |
| Comp. Ex. 13 | Apical NPI | 125 | 200 | 10 | 0.14 | CLFPP* | 455 | 1400 | 100 | 455 |

| | Properties of film after film modification step | | | | |
|---|---|---|---|---|---|
| | Cracking (winding test with paper core) | Cutting test | Rate of retention of weight % | Weight loss rate % | Total transmittance % |
| Comp. Ex. 1 | | | None | | |
| Comp. Ex. 2 | | | None | | |
| Comp. Ex. 3 | E | Poor | 50.0 | 50.0 | — |
| Comp. Ex. 4 | A | Good | 97.2 | 2.8 | 0.20 |
| Comp. Ex. 5 | A | Good | 97.2 | 2.8 | 0.20 |
| Comp. Ex. 6 | | | None | | |
| Comp. Ex. 7 | | | None | | |
| Comp. Ex. 8 | E | Poor | 50.0 | 50.0 | — |
| Comp. Ex. 9 | B | Poor | 70.0 | 30.0 | — |
| Comp. Ex. 10 | B | Poor | 70.0 | 30.0 | — |
| Comp. Ex. 11 | | | None | | |
| Comp. Ex. 12 | | | None | | |
| Comp. Ex. 13 | E | Poor | 50.0 | 50.0 | — |

*"CLFPP" stands for "continuous long film producing process".

TABLE 8

| | Carbonization step | | | | Graphitization step | | | Evaluation of productivity in graphitization, heating rate | | Properties of graphite film | | | |
|---|---|---|---|---|---|---|---|---|---|---|---|---|---|
| | Heat treatment method | Max. temp. °C. | Heating rate °C./min | Rate of retention of weight % | Heat treatment method | Max. temp. °C. | Heating rate °C./min | allowing uniform foaming °C./min | Eval. | Peeling from surface | Wrinkl-ing | MIT times | Thermal diffusivity cm²/s |
| Comp. Ex. 1 | Sheet stack | 1400 | 2 | 50.0 | Sheet stack | 2900 | 2 | 0.5 | E | E | A | E | E |
| Comp. Ex. 2 | Sheet stack | 1400 | 5 | 50.0 | Sheet stack | 2900 | 2 | 2 | B | B | E | B | B |
| Comp. Ex. 3 | Sheet stack | 1400 | 2 | 50.0 | Sheet stack | 2900 | 2 | >10 | A | A | E | A | A |
| Comp. Ex. 4 | Sheet stack | 1400 | 2 | 50.0 | Sheet stack | 2900 | 2 | 0.5 | E | E | A | E | E |
| Comp. Ex. 5 | Sheet stack | 1400 | 2 | 50.0 | Sheet stack | 2900 | 2 | 0.5 | E | E | A | E | E |
| Comp. Ex. 6 | Sheet stack | 1400 | 2 | 50.0 | Sheet stack | 2900 | 2 | <0.5 | E | E | A | E | E |
| Comp. Ex. 7 | Sheet stack | 1400 | 5 | 50.0 | Sheet stack | 2900 | 2 | 0.5 | E | E | E | E | E |
| Comp. Ex. 8 | Sheet stack | 1400 | 2 | 50.0 | Sheet stack | 2900 | 2 | >10 | A | A | E | A | A |
| Comp. Ex. 9 | Sheet stack | 1400 | 2 | 50.0 | Sheet stack | 2900 | 2 | 0.5 | E | E | A | E | E |
| Comp. Ex. 10 | Sheet stack | 1400 | 2 | 50.0 | Sheet stack | 2900 | 2 | 0.5 | E | E | A | E | E |
| Comp. Ex. 11 | Sheet stack | 1400 | 2 | 50.0 | Sheet stack | 2900 | 2 | <0.5 | E | E | A | E | E |
| Comp. Ex. 12 | Sheet stack | 1400 | 5 | 50.0 | Sheet stack | 2900 | 2 | <0.5 | E | E | E | E | E |
| Comp. Ex. 13 | Sheet stack | 1400 | 2 | 50.0 | Sheet stack | 2900 | 2 | 2 | B | B | E | B | B |

<Film Modification Step>

The following compares (i) Examples 1 through 17, in which the film modification step was performed in the below-described manner, with (ii) Comparative Examples 1, 2, and 14 through 16, in which no film modification step was performed. Namely, the film modification step in Examples 1 through 17 was performed by (a) heat-treating APICAL AH (polymer film) having a thickness of 75 μm at a heating rate of 5° C./min or more in a temperature range from (i) a lower limit to temperature rise being equal to or higher than a starting temperature (500° C.) of thermal decomposition of the polymer film to (ii) an upper limit to temperature rise being equal to or lower than an intermediate temperature (750° C.) of thermal decomposition of the polymer film, and thereafter (b) cooling the polymer film at a cooling rate of 10° C./min or more in a temperature range from (i) the upper limit to temperature rise to (ii) a temperature being equal to or lower than the starting temperature of thermal decomposition of the polymer film.

In each of Comparative Examples 1 and 14, the evaluation of the productivity in graphitization was 0.5° C./min, which means quite poor productivity. In each of Comparative Examples 2, 15, and 16, in which the heating rate for the carbonization was increased in order to improve the productivity in graphitization, the resulting film had a lot of wrinkles. Thus, without performing the film modification step, it was difficult to produce a graphite film having an even surface with high productivity. On the other hand, each of Examples 1 through 17 performed the film modification step, which made it possible to modify the polymer film into a raw material film which is difficult to be foamed even after graphitization. Thus, even with a higher heating rate for graphitization, the resulting graphite film had uniform foaming and therefore was free from defects such as a bump or peeling from surface. Furthermore, in the film modification step, wrinkles were not made so much. Thus, Examples 1 through 17 had improved productivity.

Similar characteristics to the above were observed also in comparison of (i) Examples 18 through 32, in which the film modification step was performed in the below-described manner, with (ii) Comparative Examples 6 and 7, in which no film modification step was performed. Namely, the film modification step in Examples 18 through 32 was performed by (a) heat-treating APICAL NPI (polymer film) having a thickness of 75 μm at a heating rate of 5° C./min or more in a temperature range from (i) a lower limit to temperature rise being equal to or higher than a starting temperature (500° C.) of thermal decomposition of the polymer film to (ii) an upper limit to temperature rise being equal to or lower than an intermediate temperature (800° C.) of thermal decomposition of the polymer film, and thereafter (b) cooling the polymer film at a cooling rate of 10° C./min or more in a temperature range from (i) the upper limit to temperature rise to (ii) a temperature being equal to or lower than the starting temperature of thermal decomposition of the polymer film. Further, similar characteristics to the above were observed also in comparison of (i) Examples 33 through 38, in which the film modification step was performed in the below-described manner, with (ii) Comparative Examples 11 and 12, in which no film modification step was performed. Namely, the film modification step in Examples 33 through 38 was performed, by use of APICAL NPI having a thickness of 125 μm as a raw material (polymer film), in a part of a temperature range from (i) a starting temperature (500° C.) of decomposition of the polymer film to (ii) an intermediate temperature (800° C.) of thermal decomposition of the polymer film. Thus, the effects of the film modification step were confirmed.

<Heating Rate During Film Modification Step>

The following compares Examples 2 and 8 through 11, and Comparative Example 4, which used APICAL AH having a thickness of 75 μm as a raw material in common but set respective different heating rates during the film modification step. Examples 2 and 8 through 11, whose heating rates were 5° C./min or more, had good evaluations of the productivity in graphitization; that is, the effects of the film modification step were notably achieved in Examples 2 and 8 through 11. On the other hand, Comparative Example did not have such an improved evaluation of the productivity in graphitization. The reason for this is assumed that giving a heat history of a thermal change(s) to the polymer film at the high rate disordered the molecular chain, and as a result, the polymer film could be modified into a raw material which was difficult to be foamed. Particularly in the case where the heating rate was 50° C./min or more, the effects of the film modification step were achieved notably.

Similar characteristics to the above were observed also in comparison of Examples 19, and 23 through 26, and Comparative Example 9, each of which used APICAL NPI having a thickness of 75 μm as a raw material. Namely, it was confirmed that the effects of the film modification step were likely to be achieved in the case where the heating rate was 5° C./min.

<Cooling Rate During Film Modification Step>

The following compares Examples 2, and 12 through 15, and Comparative Example 5, which used APICAL AH having a thickness of 75 μm as a raw material in common but set respective different cooling rates during the film modification step. Examples 2 and 12 through 15, whose cooling rates were 10° C./min or more, had good evaluations of the productivity in graphitization; that is, the effects of the film modification step were notably achieved in Examples and 12 through 15. On the other hand, Comparative Example 5 did not have such an improved evaluation of the productivity in graphitization. The reason for this is assumed that cooling the polymer film at the high rate quenched the disordered molecular chain with the disordered state maintained, and as a result, the polymer film could be modified into a raw material which was difficult to be foamed. Particularly in the case where the cooling rate was 100° C./min or more, the effects of the film modification step were achieved notably.

Similar characteristics to the above were observed also in comparison of Examples 19 and 27 through 30, and Comparative Example 10, each of which used APICAL NPI having a thickness of 75 μm as a raw material. Namely, it was confirmed that the effects of the film modification step were more likely to be achieved with a higher cooling rate.

<Temperature Range in which Film Modification Step is Performed>

The following compares Examples 1 through 7 and Comparative Example 3, which used APICAL AH having a thickness of 75 μm as a raw material in common but set respective different upper limits to temperature rise during the film modification step. The films of Examples 1 through 7, whose upper limits to temperature rise during the film modification step were 750° C. or lower, were difficult to crack in the winding test with the paper core, as compared with that of Comparative Example 3. This is because that each of the polymer films of Examples 1 through 7 had not been heat-treated until the decomposition reaction thereof was completed, and as a result, an amount that the polymer film shrinks was small and therefore the polymer film was difficult to get wrinkles. Furthermore, since each of the polymer films of Examples 1 through 7 still maintained the nature of the polymer and therefore was not hardened, the polymer film was difficult to be damaged. Particularly, the polymer films of Examples 1 through 3, whose maximum temperatures were 605° C. or lower, were difficult to crack.

Further, the higher the upper limit to temperature rise during the film modification step was, the better the evaluation of the productivity in graphitization was and the more the foaming was reduced. Particularly in the case where the upper limit to temperature rise was 580° C. or higher, the evaluation of the productivity in graphitization was quite good, and the effects of the film modification step were achieved adequately.

However, in the case where the upper limit to temperature rise was set too high, the molecular orientation of the polymer film was disordered too much in the film modification step, which led to the poor results of the MIT test and the thermal diffusivity measurement. A particularly preferable upper limit to temperature rise during the film modification step is 630° C. or lower.

In Examples 2 and 7, which differ only in the temperature at which the film modification step was started, the graphite films having similar properties were produced. This shows that no particular control is necessary for a heat treatment performed in a temperature range equal to or lower than 500° C., which is the starting temperature of the decomposition of the polymer film.

Similar characteristics to the above were observed also in comparison of Examples 18 through 22 and Comparative Example 8, which used APICAL NPI having a thickness of 75 μm as a raw material in common but set respective different upper limits to temperature rise during the film modification step. The films of Examples 18 through 22, whose upper limits to temperature rise during the film modification step were 800° C. or lower, were difficult to crack in the winding test with the paper core, as compared with that of Comparative Example 8. This is because that each of the polymer films of Examples 18 through 22 had not been heat-treated until the decomposition reaction thereof was completed, and as a result, an amount that the polymer film shrinks was small and therefore the polymer film was difficult to get wrinkles. Furthermore, since each of the polymer films of Examples 18 through 22 still maintained the nature of the polymer and therefore was not hardened, the polymer film was difficult to be damaged. Particularly, the polymer films of Examples 18 and 19, whose upper limits to temperature rise were 630° C. or lower, were difficult to crack.

Further, the higher the upper limit to temperature rise during the film modification step was, the better the evaluation of the productivity in graphitization was and the more the foaming was reduced. Particularly in the case where the upper limit to temperature rise was 630° C. or higher, the evaluation of the productivity in graphitization was quite good, and the effects of the film modification step were achieved adequately.

In Examples 19 and 22, which differ only in the temperature at which the film modification step was started, the graphite films having similar properties were produced. This shows that no particular control is necessary for heat treatment performed in a temperature range equal to or lower than 500° C., which is the starting temperature of the decomposition of the polymer film.

Similar characteristics to the above were observed also in comparison of Examples 33 through 36 and Comparative Example 13, which used APICAL NPI having a thickness of 125 μm as a raw material in common but set respective different upper limits to temperature rise during the film modification step. The films of Examples 33 through 36, whose upper limits to temperature rise during the film modification step were 800° C. or lower, were difficult to crack in the winding test with the paper core, as compared with that of Comparative Example 13. The reason for this is that each of the polymer films of Examples 33 through 36 had not been heat-treated until the decomposition reaction thereof was completed, and as a result, an amount that the polymer film shrinks was small and therefore the polymer film was difficult to get wrinkles. Furthermore, since each of the polymer films of Examples 33 through 36 still maintained the nature of the polymer and therefore was not hardened, the polymer film was difficult to be damaged. Particularly, the polymer films of Examples 33 and 34, whose upper limits to temperature rise were 630° C. or less, were difficult to crack.

Further, the higher the maximum temperature during the film modification step was, the better the evaluation of the productivity in graphitization was and the more the foaming was reduced. Particularly in the case where the maximum temperature was 630° C. or higher, the evaluation of the productivity in graphitization was quite good, and the effects of the film modification step were achieved adequately.

<Decomposition Reaction of Polymer and Weight Loss Rate>

The following compares Examples 1 through 6 and Comparative Example 3, which used APICAL AH having a thickness of 75 μm as a raw material in common but performed the film modification step so as to give respective different rates of decrease in weight. The films of Examples 1 through 6, whose rates of decrease in weight were 38.0% or less, were difficult to crack in the winding test with the paper core, as compared with that of Comparative Example 3. This is because that the decomposition reaction of each of the polymer films of Examples 1 through 6 had not been completed, and as a result, an amount that the polymer film shrinks was small and therefore the polymer film was difficult to get wrinkles. Furthermore, since each of the polymer films of Examples 1 through 6 still maintained the nature of the polymer and therefore was not hardened, the polymer film was difficult to be damaged. Particularly, the polymer films of Examples 1 through 3, whose rates of decrease in weight were 15.0% or less, were difficult to crack.

Further, the higher the weight loss rate was, the better the evaluation of the productivity in graphitization was and the more the foaming was reduced. Particularly in the case where the weight loss rate was 2.8% or more, the evaluation of the productivity in graphitization was quite good, and the effects of the film modification step were achieved adequately.

However, in the case the weight loss rate was too high, the molecular orientation of the polymer film was disordered too much in the film modification step, which led to the poor results of the MIT test and the thermal diffusivity measurement. A particularly preferable weight loss rate for the film modification step is 26.5% or less.

Similar characteristics to the above were observed also in comparison of Examples 18 through 21 and Comparative Example 8, which used APICAL NPI having a thickness of 75 μm as a raw material in common but had respective different rates of decrease in weight. The films of Examples 18 through 21, whose rates of decrease in weight were 44.0% or less, were difficult to crack in the winding test with the paper core, as compared with that of Comparative Example 8. This is because that the decomposition reaction of each of the polymer films of Examples 18 through 21 had not been completed, and as a result, an amount that the polymer film shrinks was small and therefore the polymer film was difficult to get wrinkles. Furthermore, since the polymer film still maintained the nature of the polymer and therefore was not hardened, the polymer film was difficult to be damaged. Particularly, the polymer films of Examples 18 and 19, whose rates of decrease in weight were 30.0% or less, were difficult to crack.

Further, the higher the weight loss rate was, the better the evaluation of the productivity in graphitization was and the more the foaming was reduced. Particularly in the case where the weight loss rate was 30% or more, the evaluation of the productivity in graphitization was quite good, and the effects of the film modification step were achieved adequately.

Similar characteristics to the above were observed also in comparison of Examples 33 through 36 and Comparative Example 13, which used APICAL NPI having a thickness of 125 μm as a raw material in common but had respective different rates of decrease in weight. The films of Examples 33 through 36, whose rates of decrease in weight were 44.0% or less, were difficult to crack in the winding test with the paper core, as compared with that of Comparative Example 13. This is because that the decomposition reaction of each of the polymer films of Examples 33 through 36 had not been completed, and as a result, an amount that the polymer film shrinks was small and therefore the polymer film was difficult to get wrinkles. Furthermore, since the polymer film still maintained the nature of the polymer and therefore was not hardened, the polymer film was difficult to be damaged. Particularly, the polymer films of Examples 33 and 34, whose rates of decrease in weight were 30.0% or less, were difficult to crack.

Further, the higher the weight loss rate was, the better the evaluation of the productivity in graphitization was and the more the foaming was reduced. Particularly in the case where the weight loss rate was 30% or more, the evaluation of the productivity in graphitization was quite good, and the effects of the film modification step were achieved adequately.

<Method of Performing Film Modification Step>

The following compares Examples 2, 16, and 17, which used APICAL AH having a thickness of 75 μm as a raw material in common but performed the film modification step through respective different methods. The levels of the evaluation of the productivity in graphitization, i.e., the levels of the effects of the film modification step in descending order are: Example 2, which performed the film modification step through the continuous long film producing process; Example 16, which performed the film modification step through the continuous process with a container; and Example 17, which performed the film modification step through the batch-wise process with a container. This is because that since Examples 2 and 16 performed the film modification step through the continuous process, the film could be taken out from the furnace immediately after the heat treatment and accordingly the cooling rate could be increased. Particularly in Example 2, only the film, which has a small thermal capacity, was taken out from the heating space, and therefore the cooling rate could be increased and the effects of the film modification step were achieved outstandingly. Furthermore, since Example 2 performed the film modification step through the continuous long film producing process and therefore could heat-treat the film while applying a tension to the film itself, the film after the film modification step got less wrinkles and had less cracks in the winding test with the paper core, as compared with Examples which performed the film modification step through other processes.

Similar characteristics to the above were observed also in (i) comparison of Examples 19, 31, and 32, each of which used APICAL NPI having a thickness of 75 μm as a raw material and (ii) comparison of Examples 34, 37, and 38, each of which used APICAL NPI having a thickness of 125 μm as a raw material. This shows that the film modification step is performed preferably through the continuous process, more preferably through the continuous long film producing process.

<Relationship Between Birefringence and Suitable Film Modification Step>

The following compares (i) Examples 1 through 6 and Comparative Example 1, each of which used APICAL AH having a thickness of 75 μm and a birefringence of 0.10 as a raw material, with (ii) Examples 18 through 21 and Comparative Example 6, each of which used APICAL NPI having a birefringence of 0.14 as a raw material.

First, comparison in terms of the evaluation of the productivity in graphitization is made between Comparative Examples 1 and 6, in each of which a foaming treatment step (i.e., the film modification step) was not performed. According to the comparison, reducing the heating rate for graphitization to 0.5° C./min in Comparative Example 1 resulted in uniform foaming; on the other hand, doing so in Comparative Example 6 did not result in uniform foaming. This is because that, as compared with APICAL NPI, APICAL AH has a lower birefringence and therefore has poorer molecular orientation originally; thus, APICAL AH is more difficult to be foamed than APICAL NPI.

Next, comparison is made between Examples 1 through 6 and 18 through 21, in each of which the foaming treatment step was performed. In the case where APICAL AH was used as a raw material, e.g., in Example 2, the weight loss rate was 2.8% and the productivity in graphitization was evaluated as A. On the other hand, in the case where APICAL NPI was used as a raw material, the weight loss rate was 30.0% and the productivity in graphitization was evaluated as B. This shows that APICAL AH is more likely to bring about the effects of the film modification step. This is also because that APICAL AH has poorer molecular orientation originally, and therefore the molecular chain thereof can be disordered even by the foaming treatment step performed at a lower temperature.

In the case where the film modification step was performed at a high temperature on APICAL AH having a low birefringence, the evaluations of the MIT test and the thermal diffusivity were poor as in Examples 4 through 6. This is because that in such the case, the molecular chain of the film was disordered too much in the film modification step, and thus the film was made to be difficult to be graphitized.

<Presence or Absence of Carbonization Step and Shape of Polymer Film During Carbonization Step>

In Example 39, in which the carbonization step was not performed, the resulting graphite film got some more wrinkles than in Example 2. However, other than this, the graphite film of Example 39 had the same quality as that of the graphite film of Example 2. Thus, the comparison of Example 2 with Example 39 shows that it is possible to produce a high-quality graphite film even if the carbonization step is not performed.

In Example 40, in which the carbonization step was performed on the roll-shaped polymer film, the resulting graphite film had the same quality as that of the graphite film produced in Example 2, in which the carbonization step was performed on the polymer film having been cut. This shows that it is possible to produce a high-quality graphite film regardless of the shape of the polymer film during the carbonization step.

In Example 41, in which the carbonization step was not performed and the graphitization step was performed on the roll-shaped polymer film, the resulting graphite film had the same quality as that of the graphite film produced in Example 39, in which the graphitization step was performed on the polymer film having been cut into a sheet-like shape. This shows that it is possible to produce a high-quality graphite film regardless of the shape of the polymer film during the graphitization step.

<Type of Polymer Film>

Comparison of Example 2 with Example 42 shows that, even in a case where a different type of a polymer film is used, it is possible to produce a high-quality graphite film by the method of the present invention for producing a graphite film.

In Example 43, in which POD was used as the polymer film, the resulting graphite film was excellent in the evaluations of the peeling from surface, the wrinkling, and the MIT test, although the graphite film had a low thermal diffusivity. Thus, the method of the present invention for producing a graphite film is effective also to different types of polymer films.

REFERENCE SIGNS LIST

11 Bump
12 Peeling from surface
21 Polymer film
22 Polymer film after film modification step
23 Heat treatment apparatus
24 Winding apparatus
25 Temperature distribution inside heat treatment apparatus
26 Schematic view of film modification step through continuous long film producing process
41 Hearth
42 Weight
51 Wrinkles
61 Polymer film after heat treatment
71 Rolled-up polymer film after film modification step or carbonization step
72 Hearth
73 Direction of gravitational force

The invention claimed is:

1. A method for producing a graphite film by heat-treating a polymer film, comprising:
a film modification step for performing heat treatment at a heating rate of 5° C./min or more in a temperature range from (i) a lower limit to temperature rise being equal to or higher than a starting temperature of thermal decomposition of the polymer film to (ii) an upper limit to temperature rise being equal to or lower than an intermediate temperature of thermal decomposition of the polymer film while continuously feeding a long polymer film into a heat treatment apparatus, the polymer film having a birefringence of less than 0.13and the upper limit to temperature rise being 605° C. or lower;
following the film modification step, performing cooling at a cooling rate of 10° C./min or more in a temperature range from (i) the upper limit to temperature rise to (ii) a temperature being equal to or lower than the starting temperature of thermal decomposition of the polymer film; and thereafter
performing heat treatment at a temperature of 2000° C. or higher.

2. The method as set forth in claim 1, wherein the polymer film has a weight loss rate of 1.1% or more but 38.0% or less as a result of the film modification step.

3. A method for producing a graphite film by heat-treating a polymer film, comprising:
a film modification step for performing heat treatment at a heating rate of 5° C./min or more in a temperature range from (i) a lower limit to temperature rise being equal to or higher than a starting temperature of thermal decomposition of the polymer film to (ii) an upper limit to temperature rise being equal to or lower than an intermediate temperature of thermal decomposition of the polymer film while holding a whole of the polymer film in a heat treatment apparatus, the polymer film having a birefringence of less than 0.13 and the upper limit to temperature rise being 605° C. or lower;
following the film modification step, performing cooling at a cooling rate of 10° C./min or more in a temperature range from (i) the upper limit to temperature rise to (ii) a temperature being equal to or lower than the starting temperature of thermal decomposition of the polymer film; and
thereafter performing heat treatment at a temperature of 2000° C. or higher.

4. The method as set forth in claim 3, wherein the film modification step is a step of heat-treating, through a batch-wise process, the polymer film while holding the polymer film in the heat treatment apparatus.

5. The method as set forth in claim 3, wherein the film modification step is a step of causing the polymer film held in a container to pass through a heating device.

6. The method as set forth in claim 3, wherein the polymer film has a weight loss rate of 1.1% or more but 38.0% or less as a result of the film modification step.

7. The method as set forth in claim 5, wherein the film modification step is performed while the polymer film is moving through the heat treatment apparatus.

* * * * *